(12) United States Patent
Nagai et al.

(10) Patent No.: US 8,861,544 B2
(45) Date of Patent: Oct. 14, 2014

(54) BROADCASTING METHOD FOR SENDING SIGNAL CONTAINING PREDETERMINED INFORMATION AND RADIO APPARATUS

(75) Inventors: Makoto Nagai, Kakamigahara (JP); Ken Nakaoka, Ichinomiya (JP); Keisuke Higuchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 353 days.

(21) Appl. No.: 13/131,717

(22) PCT Filed: Nov. 27, 2009

(86) PCT No.: PCT/JP2009/006449
§ 371 (c)(1),
(2), (4) Date: May 31, 2011

(87) PCT Pub. No.: WO2010/061635
PCT Pub. Date: Jun. 3, 2010

(65) Prior Publication Data
US 2011/0228866 A1    Sep. 22, 2011

(30) Foreign Application Priority Data

Nov. 28, 2008  (JP) ................................. 2008-305418

(51) Int. Cl.
*H04L 12/43* (2006.01)
*G08G 1/16* (2006.01)

(52) U.S. Cl.
CPC ........................................ *G08G 1/16* (2013.01)
USPC ........................................... 370/458; 370/459

(58) Field of Classification Search
USPC ........................................ 370/329, 458, 459
See application file for complete search history.

(56) References Cited

U.S. PATENT DOCUMENTS

| | | | |
|---|---|---|---|
| 6,751,466 B1 * | 6/2004 | Saito | 455/514 |
| 2004/0039504 A1 * | 2/2004 | Coffee et al. | 701/35 |
| 2004/0160310 A1 * | 8/2004 | Chen et al. | 340/10.2 |
| 2009/0003306 A1 * | 1/2009 | Plutov et al. | 370/348 |
| 2009/0254676 A1 * | 10/2009 | Joo et al. | 709/236 |

FOREIGN PATENT DOCUMENTS

| | | |
|---|---|---|
| JP | 2005-202913 | 7/2005 |
| JP | 2006-338282 A | 12/2006 |
| JP | 2007-251287 | 9/2007 |
| JP | 2008-022106 | 1/2008 |
| JP | 2008-283580 | 11/2008 |
| WO | WO 2008/126295 A1 | 10/2008 |

OTHER PUBLICATIONS

International Search Report issued in International Patent Application No. PCT/JP2009/006449 dated Mar. 2, 2010.
International Preliminary Report on Patentability (I) w/ English translation thereof issued in International Patent Application No. PCT/JP2009/006449 dated Jun. 9, 2011.

* cited by examiner

*Primary Examiner* — Sai-Ming Chan
(74) *Attorney, Agent, or Firm* — McDermott Will & Emery LLP

(57) ABSTRACT

A control information extraction unit receives information on a frame that contains at least a plurality slots from an access control apparatus for controlling communications between radio apparatuses. The control information extraction unit generates a frame that contains at least a plurality of slots in such a manner as to synchronize with the frame corresponding to the received information. An estimation unit (82) estimates empty slots in the plurality of slots generated. A selection unit selects, at random, at least one of the estimated. A modem unit and the like broadcast data using the selected slot.

11 Claims, 18 Drawing Sheets

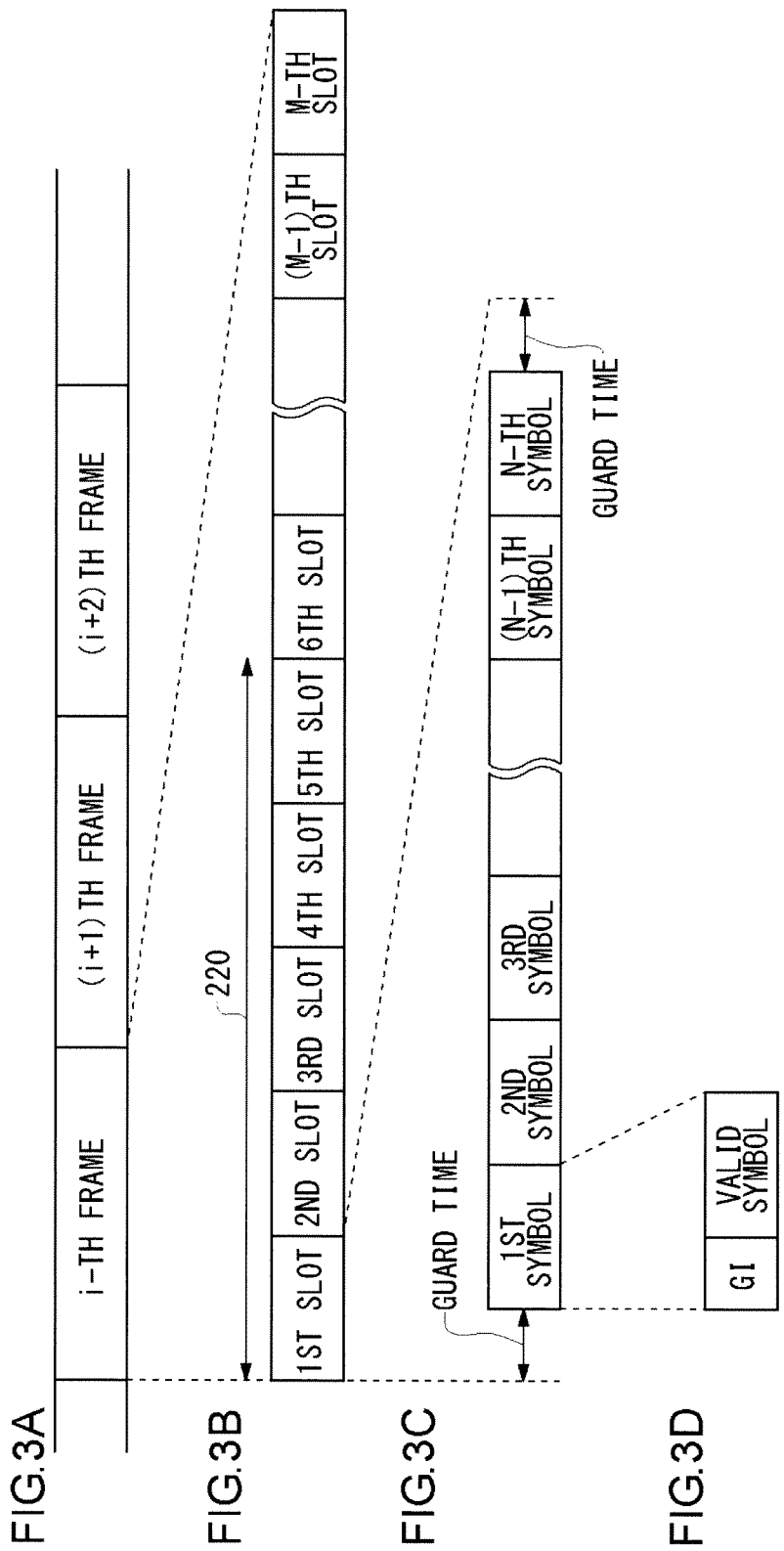

FIG.4A

| | | | | | | | | |
|---|---|---|---|---|---|---|---|---|
| 31 | N | N | N | −1 | D | D | D | |
| 30 | N | N | N | −2 | N | N | N | |
| 29 | N | N | N | −3 | D | D | D | |
| 28 | N | N | N | −4 | D | D | D | |
| 27 | N | N | N | −5 | D | D | D | |
| 26 | D | D | D | −6 | D | D | D | |
| 25 | D | D | D | −7 | P | P | P | |
| 24 | D | D | D | −8 | D | D | D | |
| 23 | D | D | D | −9 | D | D | D | |
| 22 | D | D | D | −10 | D | D | D | |
| 21 | P | P | P | −11 | D | D | D | |
| 20 | D | D | D | −12 | D | D | D | |
| 19 | D | D | D | −13 | D | D | D | |
| 18 | D | D | D | −14 | D | D | D | |
| 17 | D | D | D | −15 | D | D | D | |
| 16 | D | D | D | −16 | D | D | D | ... |
| 15 | D | D | D | −17 | D | D | D | |
| 14 | D | D | D | −18 | D | D | D | |
| 13 | D | D | D | −19 | D | D | D | |
| 12 | D | D | D | −20 | D | D | D | |
| 11 | D | D | D | −21 | P | P | P | |
| 10 | D | D | D | −22 | D | D | D | |
| 9 | D | D | D | −23 | D | D | D | |
| 8 | D | D | D | −24 | D | D | D | |
| 7 | P | P | P | −25 | D | D | D | |
| 6 | D | D | D | −26 | N | N | N | |
| 5 | D | D | D | −27 | N | N | N | |
| 4 | D | D | D | −28 | N | N | N | |
| 3 | D | D | D | −29 | N | N | N | |
| 2 | N | N | N | −30 | N | N | N | |
| 1 | D | D | D | −31 | N | N | N | |
| 0 | N | N | N | −32 | N | N | N | |

FIG.4B

| | | | | | | | | |
|---|---|---|---|---|---|---|---|---|
| 31 | N | N | N | -1 | N | N | N | |
| 30 | N | N | N | -2 | N | N | N | |
| 29 | N | N | N | -3 | D | D | D | |
| 28 | N | N | N | -4 | D | D | D | |
| 27 | N | N | N | -5 | D | D | D | |
| 26 | D | D | D | -6 | D | D | D | |
| 25 | D | D | D | -7 | P | P | P | |
| 24 | D | D | D | -8 | D | D | D | |
| 23 | D | D | D | -9 | D | D | D | |
| 22 | D | D | D | -10 | D | D | D | |
| 21 | P | P | P | -11 | D | D | D | |
| 20 | D | D | D | -12 | D | D | D | |
| 19 | D | D | D | -13 | D | D | D | |
| 18 | D | D | D | -14 | D | D | D | |
| 17 | D | D | D | -15 | D | D | D | |
| 16 | D | D | D | -16 | D | D | D | ... |
| 15 | D | D | D | -17 | D | D | D | |
| 14 | D | D | D | -18 | D | D | D | |
| 13 | D | D | D | -19 | D | D | D | |
| 12 | D | D | D | -20 | D | D | D | |
| 11 | D | D | D | -21 | P | P | P | |
| 10 | D | D | D | -22 | D | D | D | |
| 9 | D | D | D | -23 | D | D | D | |
| 8 | D | D | D | -24 | D | D | D | |
| 7 | P | P | P | -25 | D | D | D | |
| 6 | D | D | D | -26 | N | N | N | |
| 5 | D | D | D | -27 | N | N | N | |
| 4 | D | D | D | -28 | N | N | N | |
| 3 | D | D | D | -29 | N | N | N | |
| 2 | N | N | N | -30 | N | N | N | |
| 1 | N | N | N | -31 | N | N | N | |
| 0 | N | N | N | -32 | N | N | N | |

FIG.17

| DISTANCE ⸌230 | SLOT ⸌232 |
|---|---|
| ~ X1 | 6 ~ 15 |
| X1 ~ X2 | 16 ~ 25 |
| | |
| XL-1 ~ XL | M-S ~ M |

84

BROADCASTING METHOD FOR SENDING SIGNAL CONTAINING PREDETERMINED INFORMATION AND RADIO APPARATUS

RELATED APPLICATIONS

This application is the U.S. National Phase under 35 U.S.C. §371 of International Application No. PCT/JP2009/006449, filed on Nov. 27, 2009, which in turn claims the benefit of Japanese Application No. 2008-305418, filed on Nov. 28, 2008, the disclosures of which Applications are incorporated by reference herein.

TECHNICAL FIELD

The present invention relates to a broadcasting technology and, more particularly, to a broadcasting method for sending signal containing predetermined information and a radio apparatus.

BACKGROUND TECHNOLOGY

Road-to-vehicle communication has been under investigation in an effort to prevent collision accidents of vehicles on a sudden encounter at an intersection. In a road-to-vehicle communication, information on conditions at an intersection is communicated between a roadside unit and an in-vehicle unit. Such a road-to-vehicle communication requires installation of roadside units, which means a great cost of time and money. In contrast to this, a vehicle-to-vehicle (inter-vehicular) communication, in which information is communicated between in-vehicle units, has no need for installation of roadside units. In that case, current position information is detected in real time by GPS (Global Positioning System) or the like and the position information is exchanged between the in-vehicle units. Thus it is determined on which of the roads leading to the intersection the driver's vehicle and the other vehicles are located (See Patent Document 1, for instance).

PRIOR ART DOCUMENTS

Patent Documents

[Patent Document 1] Japanese Unexamined Patent Application Publication No. 2005-202913.

Used in wireless LANs (Local Area Networks) conforming to standards, such as IEEE 802.11, is an access control function called Carrier Sense Multiple Access with Collision Avoidance (CSMA/CA). In such a wireless LAN, therefore, the same wireless channel is shared by a plurality of terminal apparatuses. Such CSMA/CA is subject to conditions involving mutual wireless signals not reaching the targets, namely, carrier sense not functioning, due to the effects of distance between the terminal apparatuses or obstacles attenuating the radio waves and so forth. When the carrier sense does not function, there occur collisions of packet signals transmitted from a plurality of terminal apparatuses. Also, wireless LANs employ the OFDM modulation scheme to achieve faster communication speed.

On the other hand, when a wireless LAN is applied to the inter-vehicular communication, a need arises to transmit information to a large indefinite number of terminal apparatuses, and therefore it is desirable that signals be sent by broadcast. Yet, at an intersection or like places, an increase in the number of vehicles, that is, the number of terminal apparatuses, is considered to cause an increase in the collisions of the packet signals therefrom. In consequence, data contained in the packet signals may not be transmitted to the other terminal apparatuses. If such a condition occurs in the inter-vehicular communication, then the objective of preventing collision accidents of vehicles on a sudden encounter at an intersection will not be attained.

The present invention has been made in view of the foregoing circumstances, and a purpose thereof is to provide a technology for reducing the collision probability of packet signals under conditions of increased volume of communication.

Means for Solving the Problems

In order to resolve the above problems, a radio apparatus according to one embodiment of the present invention includes: a receive unit configured to receive information on a frame that contains at least a plurality slots from an access control apparatus for controlling communications between radio apparatuses; a generator configured to generate a frame that contains at least a plurality of slots in such a manner as to synchronize with the frame corresponding to the information received by the receive unit; an estimation unit configured to estimate empty slots in the plurality of slots generated by the generator; a selection unit configured to select at least one of the empty slots estimated by the estimation unit; and a broadcasting unit configured to broadcast data using the slot selected by the selection unit.

Another embodiment of the present invention relates to a broadcasting method. The method includes: receiving information on a frame that contains at least a plurality slots from an access control apparatus for controlling communications between radio apparatuses; a frame that contains at least a plurality of slots in such a manner as to synchronize with the frame corresponding to the received information; estimating empty slots in the plurality of slots generated by the generating; selecting at least one of the empty slots estimated by the estimating; and broadcasting data using the slot selected by the selecting.

Optional combinations of the aforementioned constituting elements, and implementations of the invention in the form of methods, apparatuses, systems, recording media, computer programs and so forth may also be practiced as additional modes of the present invention.

Effect of the Invention

The present invention reduces the collision probability of packet signals under conditions of increased volume of communication.

BRIEF DESCRIPTION OF THE DRAWINGS

FIGS. 3A to 3D show formats of frames specified by a frame specifying unit of FIG. 2.

FIGS. 4A and 4B show formats of OFDM symbol used in the communication system of FIG. 1.

FIG. 17 shows a data structure of a table stored in a selection unit of FIG. 16.

BEST MODE FOR CARRYING OUT THE INVENTION

Figure 1:
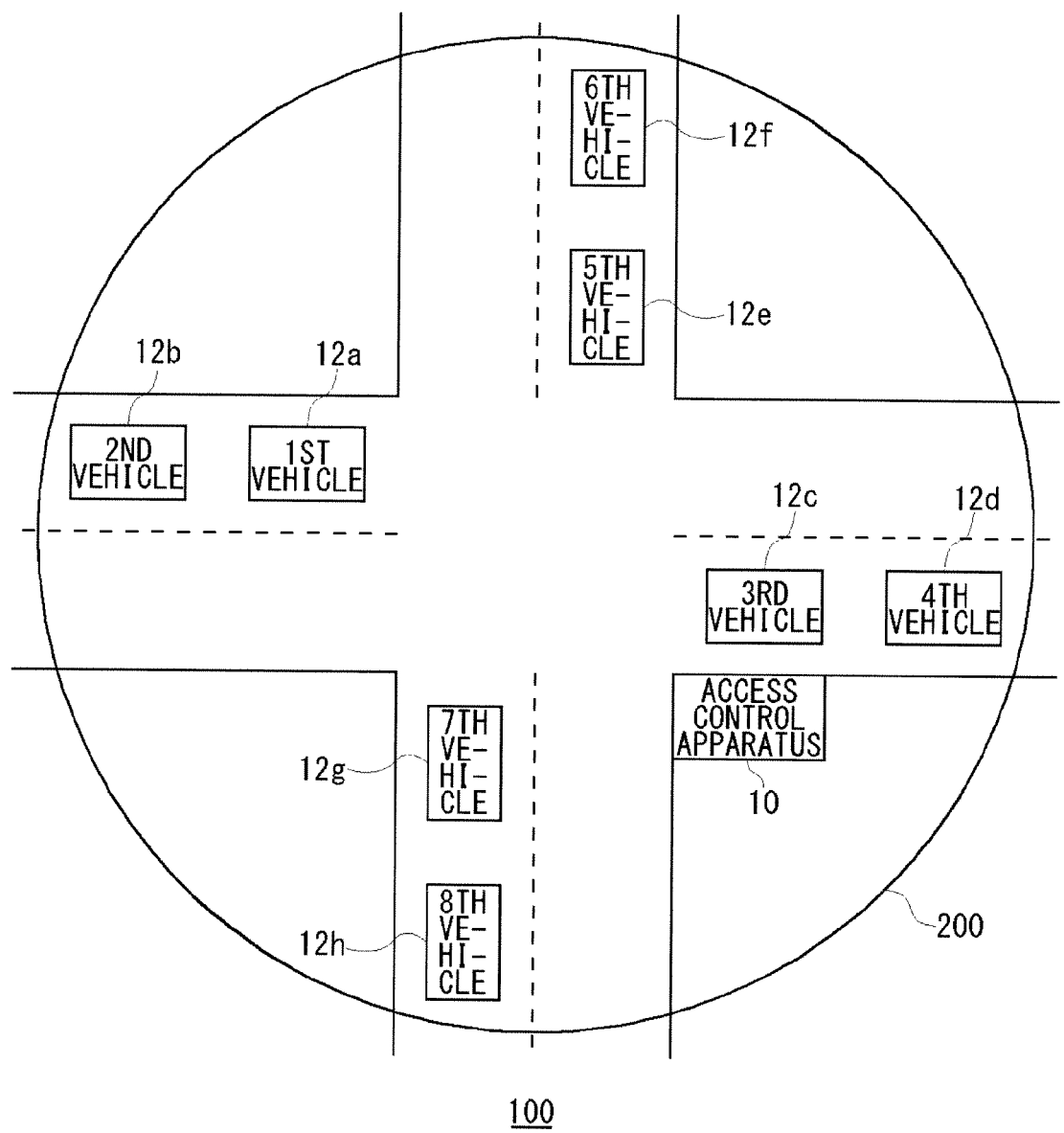
FIG. 1 shows a structure of a communication system according to an exemplary embodiment of the present invention.

The present invention will be outlined before it is explained in detail. Exemplary embodiments of the present invention relate to a communication system carrying out data communication between terminal apparatuses installed in vehicles. A terminal apparatus transmits, by broadcast, packet signals containing information such as the traveling speed and position of a vehicle (hereinafter referred to as "data"). And the other terminal apparatuses receive the packet signals and recognize the approach or the like of the vehicle based on the data. Note here that the terminal apparatuses employ the OFDM modulation scheme to achieve faster communication speed. Under these circumstances, an increase in the number of terminal apparatuses at an intersection or like place increases the probability of packet signals occurring. To cope with it, the communication system according to the present exemplary embodiment executes the following processes.

The communication system according to the present exemplary embodiment includes an access control apparatus in addition to a plurality of terminal apparatuses, and the access control apparatus is installed at an intersection, for instance. The access control apparatus repeatedly specifies a frame containing a plurality of slots. Note that a part of the plurality of frames contained in each frame are reserved and secured as control slots. Also, the access control apparatus identifies control slots to be used, and adds information on timings of the control slots and information with which to identify said access apparatus (hereinafter referred to as "identification information") to control information. Also, the access control apparatus transmits, by broadcast, a packet signal containing the control information (hereinafter referred to sometimes as "control information" also) using the control slots. Here, the information on timings of the control slots is, for instance, information on which slot number, starting from the beginning of a frame, the control slot is assigned to (this information will be referred to as "control slot information").

A terminal apparatus receives the control information and thereby generates a frame corresponding to the control information. The thus generated frame contains a plurality of slots as well. Also, the terminal apparatus recognizes slots, in the plurality of slots contained in the frame, which are other than the control slots. Note that in the description given hereunder the slots sometimes mean those excluding the control slots. Each terminal apparatus performs carrier sensing on a plurality of control slots, respectively, and thereby it estimates a slot which are not used by other terminal terminals (hereinafter referred to as an "empty slot"). There may be a plurality of such empty slots. The terminal apparatus selects at random one slot to be used for the transmission of data from among empty slots. The terminal apparatus transmits, by broadcast, a packet signal containing data (hereinafter referred to sometimes as "data" also) using the selected slot. After a predetermined number of frames has elapsed, the terminal apparatus repeats the processing which starts from the carrier sensing.

Note here that the access control apparatus has no direct involvement in data communication between terminal apparatuses, that is, the access control apparatus does not directly specify the slot to be used in the data communication. In other words, the access control apparatus only conveys the construction of a frame containing slots to be used by a plurality of terminal apparatus. The terminal apparatus performs data communication with timings of slots contained in the frame notified by the access control apparatus. That is, the access control apparatus controls the communications between a plurality of terminal apparatuses.

It is to be noted that since the control information is also transmitted in a single slot, there are chances that the data transmitted from a terminal apparatus incapable of receiving the control information may collide with the control information. In consequence, if the other terminal apparatuses cannot receive the control information, then there arises a difficulty of carrying out the aforementioned processes. To cope with this situation, the OFDM signals used in transmitting data have some of the subcarriers as null carriers in which no data is contained (these subcarriers being hereinafter referred to as "identification carriers"). On the other hand, the OFDM signals used in transmitting control information have signals placed in the identification carriers, too. Hence, even when there is a collision between data and control information, the terminal apparatus can detect the presence of control information by observing the signal components of the identification carrier.

Further, if a plurality of access apparatuses are installed at an intersection where they are located close to each other, interference between them must be taken into consideration. If, for instance, the control information transmitted by broadcast from the plurality of access control apparatuses installed at the intersection interfere with each other, the terminal apparatuses may not be able to receive the control information and therefore the aforementioned processes will not be achieved. Though such interference can be avoided by assigning a different frequency channel to each access control apparatus, another separate structure to reduce the interference will be needed if no other frequency chancel can be provided. To cope with this, a plurality of control slots are reserved and secured as described above. Each access apparatus performs carrier sensing on a plurality of control slots, respectively, and thereby it selects one control slot and transmits, by broadcast, the control information using the selected control slot.

FIG. 1 shows a structure of a communication system 100 according to an exemplary embodiment of the present invention. FIG. 1 corresponds to a case thereof at an intersection viewed from above. The communication system 100 includes an access control apparatus 10 and a first vehicle 12*a*, a second vehicle 12*b*, a third vehicle 12*c*, a fourth vehicle 12*d*, a fifth vehicle 12*e*, a sixth vehicle 12*f*, a seventh vehicle 12*g*, and an eighth vehicle 12h, which are generically referred to as "vehicle 12" or "vehicles 12". It is to be noted that each vehicle 12 has a not-shown terminal apparatus installed therein. Also, an area 200 is formed by the access control apparatus 10.

As shown in FIG. 1, a road extending in the horizontal, or left-right, direction and a road extending in the vertical, or up-down, direction in FIG. 1 intersect with each other in the central portion thereof. Note here that the upper side of FIG. 1 corresponds to the north, the left side thereof the west, the down side thereof the south, and the right side thereof the east. And the portion where the two roads intersect each other is the intersection. The first vehicle 12a and the second vehicle 12b are advancing from left to right, while the third vehicle 12c and the fourth vehicle 12d are advancing from right to left. Also, the fifth vehicle 12e and the sixth vehicle 12f are advancing downward, while the seventh vehicle 12g and the eighth vehicle 12h are advancing upward.

The terminal apparatus installed in each of the vehicles 12 acquires data and transmits, by broadcast, a packet signal containing the data. Here, before explaining exemplary embodiments of the present invention, a description will be given of an operation of a terminal apparatus which is compatible with a known wireless LAN, i.e., CSMA/CA. Each terminal apparatus transmits data by broadcast when it has determined by executing carrier sense that transmission is possible. Consequently, there are chances of data from a plurality of terminal apparatuses colliding with each other. Also, as the number of terminal apparatuses increases, there will be greater probability of collisions occurring. In particular, at locations like intersections, the likelihood of data collision is greater despite the fact that the likelihood of vehicles 12 colliding with each other is also great. This means failed utilization of data in spots where data is in the greatest demand.

Therefore, the communication system 100 places an access control apparatus 10 at each intersection. The access control apparatus 10 repeatedly generates a frame containing a plurality of slots, based on the signals received from not-shown GPS satellites. Here, one or more of the plurality of slots correspond to the control slots. The access control apparatus 10 adds the control slot information and the identification information to the control information. Further, the access control apparatus 10 broadcasts the control information, using control slots. The selection of the control slot(s) will be discussed later.

A plurality of terminal apparatuses receive the control information broadcast by the access control apparatus 10 and generate frames based on the control information. As a result, the frame generated by each of the plurality of terminal apparatuses is synchronized with the frame generated by the access control apparatus 10. Thus, slots generated by the respective plurality of terminal apparatuses are synchronized with each other. Each terminal apparatus performs carrier sensing in a plurality of slots, respectively, and estimates empty slots. Also, the terminal apparatus randomly selects one slot out of the empty slots. Also, the terminal apparatus broadcasts data using the selected slot.

The terminal apparatus continues to select the same slots in corresponding timing in each frame, for a predetermined number of frames. After a predetermined number of frames has elapsed, the terminal apparatus performs carrier sensing again and randomly select a new slot. It is to be appreciated that the terminal apparatus can broadcast data even when the terminal apparatus is not receiving control information. The terminal apparatus which has received data from the other terminal apparatuses recognizes, based on the data, the presence of vehicles 12 that are carrying the other terminal apparatuses.

Note here that both the control information broadcast from the access control apparatus 10 and the data broadcast from the terminal apparatuses use OFDM signals. However, it is not the same subcarriers in which the control information and the data are placed. The data is not placed in the aforementioned identification carriers. On the other hand, identification information is placed not only in the subcarriers where the data is placed but also in the identification carriers. As a result, even when there is a collision between data and identification information, the terminal apparatus can detect the presence of control information by observing the signal components of identification carriers. It should be noted that the aforementioned detection of entry into the area 200 by the terminal apparatus may be made relative to the identification carriers.

Figure 2:
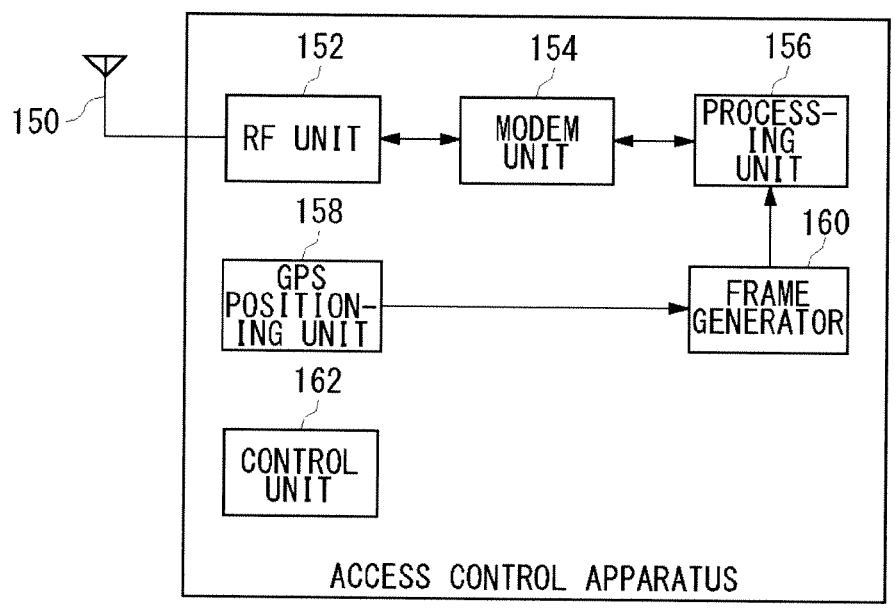
FIG. 2 shows a structure of an access control apparatus of FIG. 1.

FIG. 2 shows a structure of the access control apparatus 10. The access control apparatus 10 includes an antenna 150, an RF unit 152, a modem unit 154, a processing unit 156, a GPS positioning unit 158, a frame generator 160 and a control unit 162. The GPS positioning unit 158 receives signals from not-shown GPS satellites and acquires information on the time of day based on the received signals. It should be noted that known art can be used for the acquisition of information on the time of day and therefore the description thereof is omitted here. The GPS positioning unit 158 outputs the information on the time of day to the frame generator 160.

The frame generator 160 acquires information on the time of day from the GPS positioning unit 158. The frame generator 160 generates a plurality of frames based on the information on the time of day. For example, the frame generator 160 generates ten "100 msec" frames by dividing a duration of "1 sec" into 10 parts from the timing of "0 msec". Frames are thus defined and specified repeatedly through the repetition of this process. Also, the frame generator 160 generates a plurality of slots by dividing each frame into a plurality of parts. For example, dividing a frame into 200 parts generates 200 slots with each slot being "500 μsec" long.

Here, one or more of a plurality of slots contained in each frame is/are reserved as "control slots". For example, first five slots from the beginning of 200 slots contained in each frame are control slots. Also, the control slot is a slot used when the access control apparatus 10 broadcasts control information. The remaining slots of the plurality of slots in each frame are reserved and secured for the communications between not-shown terminal apparatuses. As previously indicated, since the communication system 100 employs the OFDM modulation scheme, each slot is so specified as to be composed of a plurality of OFDM symbols. Also, an OFDM symbol comprises a guard interval (GI) and a valid symbol. Note that a guard time may be provided in the front portion and the rear portion of each slot. It is to be noted also that a certain group of or combination of a plurality of OFDM symbols contained in a slot is equivalent to the packet signal mentioned earlier.

FIGS. 3A to 3D show the formats of frames generated by the frame generator 160. FIG. 3A shows a structure of frames. As shown in FIG. 3A, a plurality of frames, such as i-th frame to (i+2)th frame, are so specified as to be repeated. Also, the duration of each frame is "100 msec", for instance. FIG. 3B shows a structure of a single frame. As shown in FIG. 3B, a single frame consists of M units of slots. For example, M is "200" and the duration of each slot is "500 μsec". Also, slots assigned to the beginning part of each frame correspond to the control slots, and an interval where the control slots are assigned is indicated as a control region 220.

In this case, five slots which are a first slot to a fifth slot are contained in the control region 220 as the control slots. FIG. 3C shows a structure of a single slot. As shown in FIG. 3C, a guard time may be provided in the front portion and the rear portion of each slot. And the remaining duration of the slot consists of N units of OFDM symbols. FIG. 3D shows a structure of each OFDM symbol. As shown in FIG. 3D, each OFDM symbol consists of a GI and a valid symbol. Let us now refer back to FIG. 2.

The RF unit 152 receives through the antenna 150 a packet signal transmitted in communication between the other terminal apparatuses (not shown) in each slot, as a receiving processing. Here, the packet signal is sent from a terminal apparatus. The RF unit 152 performs a frequency conversion on the packet signal of a radiofrequency received through the antenna 150 and thereby generates a packet signal of baseband. Further, the RF unit 152 outputs the baseband packet signal to the modem unit 154. Generally, a baseband packet signal is formed of an in-phase component and a quadrature component, and therefore it should be represented by two signal lines. However, it is represented by a single signal line here to make the illustration clearer for understanding.

Also, the RF unit 152 includes an LNA (Low Noise Amplifier), a mixer, an AGC unit, and an A-D conversion unit. The RF unit 152 performs a frequency conversion on the baseband packet signal inputted from the modem unit 154 and thereby generates a radiofrequency packet signal in each slot as a transmission processing. Further, the RF unit 152 transmits, through the antenna 150, the radiofrequency packet signal. The RF unit 152 also includes a PA (Power Amplifier), a mixer, and a D-A conversion unit.

The modem unit 154 demodulates the radiofrequency packet signal fed from the RF unit 152, as a receiving processing. Further, the modem unit 154 outputs the demodulation result to the processing unit 156. Also, the modem unit 154 modulates the data fed from the processing unit 156, as a transmission processing. Further, the modem unit 154 outputs the modulation result to the RF unit 152 as a baseband packet signal. It is to be noted here that the communication system 100 is compatible with the OFDM modulation scheme and therefore the modem unit 154 performs FFT (Fast Fourier Transform) as a receiving processing and performs IFFT (Inverse Fast Fourier Transform) as a transmission processing also.

The processing unit 156 receives information on the timing of a frame and the timings of slots contained in the frame, from the frame generator 160. The processing unit 156 identifies the timings of control slots contained in a plurality of slots contained in the frame. In the case of FIG. 3A, five control slots contained in the control region 220 are identified. The processing unit 156 performs carrier sensing on each slot via the antenna 150, the RF unit 152 and the modem unit 154. Known art can be used as the carrier sensing and therefore the description thereof is omitted here. It is appreciated that the processing unit 156 may receive the received signals from the RF unit 152 without the signals being passed through the modem unit 154. The processing unit 156 selects one control slot out of the five control slots based on the carrier sensing result. For example, the control slot having the minimum interference power is selected.

The processing unit 156 generates information on the selected control slot. Also, the processing unit 156 generates control information by adding the control slot information and the identification information thereto. The processing unit 156 assigns the control information to the selected control slot. The processing unit 156 outputs the control information to the modem unit 154, using the assigned control slot. Transmitting the control information using the control slot assigned by the communication system 100 is equivalent to notifying the timing of control slots in a frame. Since the relative position of control slots in a frame is contained in the control slot information, said transmitting the control information using the control slot assigned by the communication system 100 is also equivalent to notifying the timing of the frame.

As described above, the communication system 100 is compatible with the OFDM modulation scheme and therefore the processing unit 156 generates the control information as an OFDM signal. Note here that the OFDM signals are also used for the communications between a not-shown plurality of terminal apparatuses. A description is given herein by comparing an OFDM signal that has the control information assigned (hereinafter this is sometimes called "control information" also) with an OFDM signal that has data assigned (hereinafter this is sometimes called "data" also). FIGS. 4A and 4B illustrate formats of OFDM symbols used in the communication system 100. FIG. 4A corresponds to control information, whereas FIG. 4B corresponds to data.

In both FIG. 4A and FIG. 4B, the vertical direction represents the frequency, whereas the horizontal direction represents time. The numbers "31", "30", ..., "−32" are indicated from top along the vertical direction, and these are the numbers assigned to identify subcarriers (hereinafter referred to as "subcarrier numbers"). In OFDM signals, the frequency of a subcarrier whose subcarrier number is "31" is the highest, whereas the frequency of a subcarrier whose subcarrier number is "−32" is the lowest. In FIG. 4 and FIG. 4B, "D" corresponds to a data symbol, "P" a pilot symbol, and "N" a null.

What are common to the control information and the data are the subcarrier numbers "31" to "27", "2", "0", and "−2", and the subcarrier numbers "−26" to "−32" which are all null. Of the control information, the subcarrier numbers "26" to "3", "−3" to "−25" are also used in data, and the use of symbols is the same for both the control information and the data. of the control information, on the other hand, the subcarrier numbers "1" and "−1" are not used for data. These correspond to the aforementioned identification carriers. That is, the identification carrier is assigned to a subcarrier near the center frequency of an OFDM signal. Of the control information, a guard band is provided between a subcarrier used also for data and the identification carrier, namely between the subcarrier number "2" and the subcarrier number "−2". The subcarriers of the subcarrier number "−2" through the subcarrier number "2" may be collectively called "identification carrier" or "identification carriers".

Here, the processing unit 156 assigns the information on frames and the slot numbers to the identification carrier. Also, the processing unit 156 preferentially assign information having higher degrees of importance to the identification carrier. Also, a known signal is assigned to an OFDM symbol which is located anterior to the packet signal. Such a known signal is used for AGC (Automatic Gain Control) or used to estimate the channel characteristics. The processing unit 156 may assign a known signal to the identification carrier over a partial period of a predetermined slot. Such a known signal is used as a unique word (UW), for example. Let us now refer back to FIG. 2.

The modem unit 154 and the RF unit 152 transmit, by broadcast, the control information generated by the processing unit 156 from the antenna 150, using the control slots. One of the destinations of the control information is a terminal apparatus. The terminal apparatus having received the control information recognizes the timing of each slot and uses at least one of the remaining slots reserved for the communications between terminal apparatuses. The control unit 162 controls the entire processing of the access control apparatus 10.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 5:
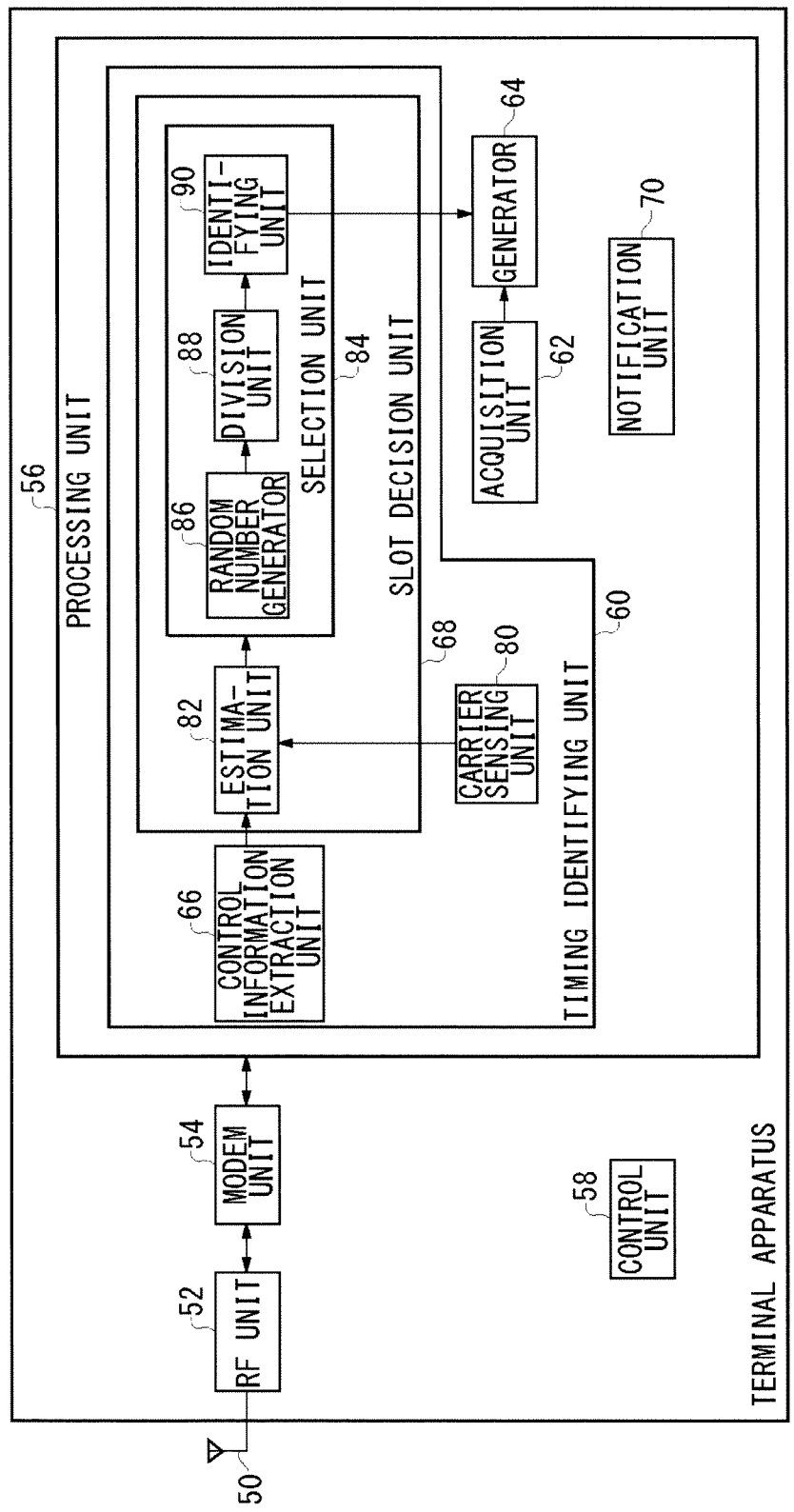
FIG. 5 shows a structure of a terminal apparatus mounted on a vehicle of FIG. 1.

FIG. 5 shows a structure of a terminal apparatus 14 mounted on a vehicle 12. The terminal apparatus 14 includes an antenna 50, an RF unit 52, a modem unit 54, a processing unit 56, and a control unit 58. The processing unit 56 includes a timing identifying unit 60, an acquisition unit 62, a generator 64, and a notification unit 70. The timing identifying unit 60 includes a control information extraction unit 66, a slot decision unit 68, and a carrier sensing unit 80. The slot decision unit 68 includes an estimation unit 82 and a selection unit 84. The selection unit 84 includes a random number generator 86, a division unit (divider) 88, and an identifying unit 90. The antenna 50, the RF unit 52 and the modem unit 54 carry out the processings similar to those carried out by the antenna 150, the RF unit 152 and the modem unit 154 of FIG. 2, respectively. Thus, the repeated description thereof is omitted here.

Figure 6:
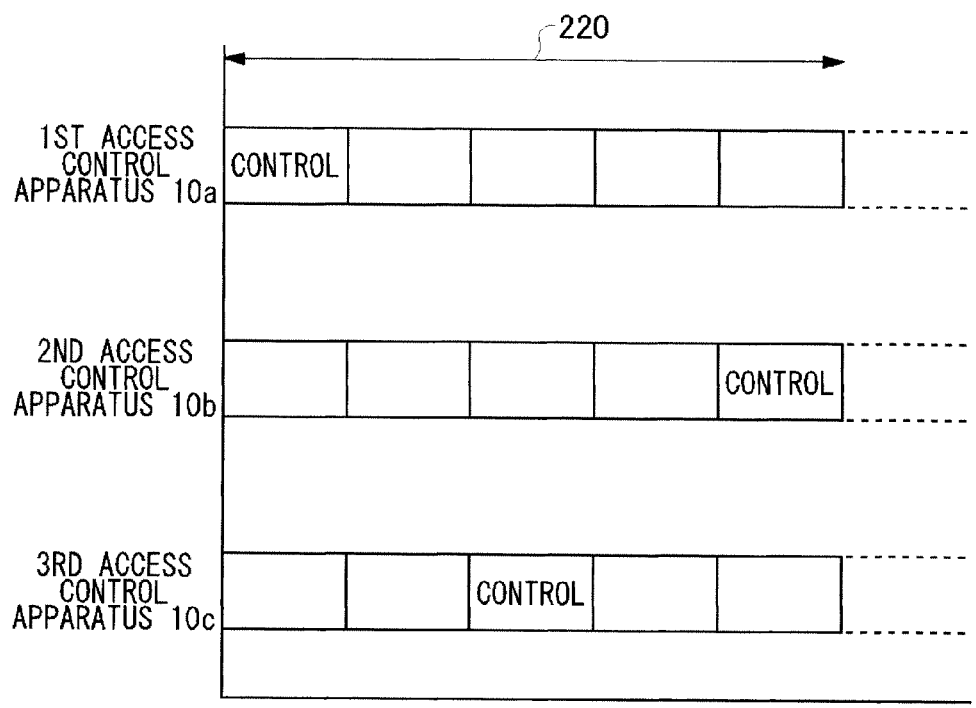
FIG. 6 shows an operational overview of the communication system of FIG. 1.

The acquisition unit 62 includes a GPS receiver, a gyroscope, a vehicle speed sensor, and so forth all of which are not shown in FIG. 6. The acquisition unit 62 acquires the present position, traveling direction, traveling speed and so forth of a not-shown vehicle 12, namely the vehicle 12 carrying the terminal apparatus 14, based on data supplied from the aforementioned not-shown components of the acquisition unit 62. The present position thereof is indicated by the latitude and longitude. Known art may be employed to acquire them and therefore the description thereof is omitted here. The acquisition unit 62 outputs the thus acquired information to the generator 64.

The control information extraction unit 66 receives the demodulation result fed from the modem unit 54. Of the demodulation result, the control information extraction unit 66 monitors a part of subcarriers corresponding to the identification carrier. If valid data is contained in the part of subcarriers corresponding to the identification carrier, the control information extraction unit 66 will recognize that the control information extraction unit 66 is receiving a slot containing the control information therein, namely a control slot. Also, the control information extraction unit 66 establishes the synchronization between frames and slots when the timing with which the slot containing the control information is received is used as a reference.

More specifically, the control information extraction unit 66 identifies the control slots where the received demodulation result is assigned, based on the control slot information contained in the control information. Then the control information extraction unit 66 generates frames with this identified control slot as a reference. If the control information corresponds to a third slot as shown in the FIG. 3B, the control information extraction unit 66 will generate frames with the third slot as a reference. In other words, the control information extraction unit 66 generates frames each containing a plurality of slots in such a manner as to synchronize with the frame corresponding to the control slot information. The control information extraction unit 66 outputs information on the thus generated frames to the estimation unit 82.

The carrier sensing unit 80 performs carrier sensing on slots, respectively, which exclude the control slots, in a plurality of slots generated by the control information extraction unit 66. That is, the carrier sensing unit 80 measures the interference power for each slot. The carrier sensing unit 80 outputs the carrier sensing result, namely the interference power for each slot, to the estimation unit 82.

The estimation unit 82 receives, from the carrier sensing unit 80, the input of the interference powers for the respective plurality of slots contained in the frame generated by the control information extraction unit 66. Also, the estimation unit 82 estimates an empty slot based on the interference powers. More specifically, the estimation unit 82 stores a predetermined threshold value, and compares the interference power at each slot against the threshold value. The estimation unit 82 estimates a slot having an interference power below the threshold value, as an empty slots. Note that the presence of a plurality of such empty slots may be estimated. The estimation unit 82 outputs information on the estimated empty slot(s) to the selection unit 84.

The random number generator 86 generates random numbers whenever a slot are to be determined. The random number may take values uniformly between 0 and a maximum value RANDMAX. Known art may be used for the generation of the random number and therefore the description thereof is omitted here. The random number generator 86 outputs a random number to the division unit 88. The division unit 88 receives the random number from the random number generator 86. The division unit 88 receives the number of empty slots contained in the frame from the estimation unit 82. In the estimation unit 82, the random number is divided by the number of empty slots. The division unit 88 outputs the remainder of the division result to the identifying unit 90.

The identifying unit 90 receives the remainder from the division unit 88, and randomly selects one of the empty slots estimated by the estimation unit 82. More specifically, the slot decision unit 68 assigns the number "0", "1", . . . and so forth to the empty slots contained in each frame, starting from that closest to the beginning of the frame, so that the empty slot corresponding to the remainder can be identified. Since the value of the remainder differs every time a random number is generated, the identifying unit 90 tends to select a different slot whenever the slot is to be determined. The identifying unit 90 outputs information on the selected slot to the generator 64.

The generator 64 receives the information fed from the acquisition unit 62. The generator 64 generates data based on the information fed from the acquisition unit 62. Here, the data is formed as shown in FIG. 4B. The generator 64 also receives information on the selected slot from the identifying unit 90, and outputs the data to the modem unit 54, using a slot suitable for the information. As a result, the modem unit 54, the RF unit 52 and the antenna 50 broadcast the data, using the slot selected by the identifying unit 90.

If there is any data remaining to be transmitted after the data has been broadcast, the generator 64 will use again the same slot as the that used already, when transmitting the data in the subsequent frames. Note here that the same slot is equivalent to the same slot in corresponding timing in each frame. When a predetermined number of frames has elapsed after the same slot is used, the timing identifying unit 60 selects a new slot by repeating the above-described processing. The notification unit 70 acquires the data sent from not-shown other terminal apparatuses 14 and conveys the approach or the like of the not-shown other vehicles to a driver according to the content of the data. The processing performed by the notification unit 70 is not limited thereto. The control unit 58 controls the entire operation of the terminal apparatus 14.

An operation of the communication system 100 configured as above is now described. FIG. 6 shows an operational overview of the communication system 100. The horizontal direction of FIG. 6 corresponds to time, and the first access control apparatus 10*a* to the third access control apparatus 10*c* are indicated along the vertical direction of FIG. 6. Only the control region 220 in FIG. 3B is shown in FIG. 6. As described earlier, assumed herein that five control slots are assigned to the control region 220. "Control" in FIG. 6 indicates control information. The first access control apparatus 10*a* uses the leading control slot. The second access control apparatus 10*b* uses the fifth control slot. The third access control apparatus 10*c* uses the third control slot. As a result, the interference among the control information transmitted by broadcast from the respective access control apparatuses 10 is reduced.

Figure 7:
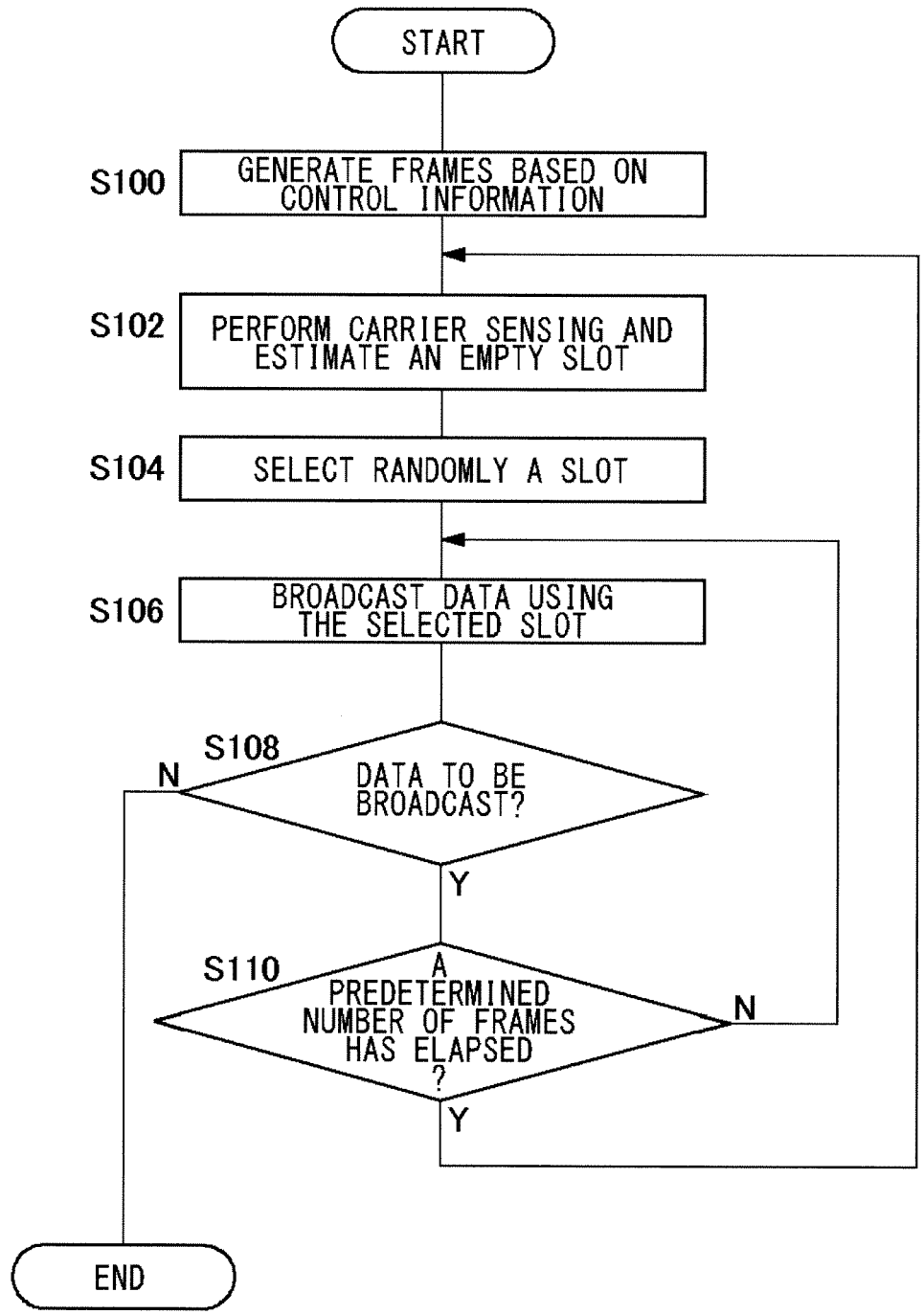
FIG. 7 is a flowchart showing a procedure in which data is broadcast by a terminal apparatus of FIG. 5.

FIG. 7 is a flowchart showing a procedure for broadcasting data by a terminal apparatus 14. The control information extraction unit 66 generates frames based on the control information (S100). The carrier sensing unit 80 performs carrier sensing and the estimation unit 82 estimates empty slots (S102). The identifying unit 90 randomly selects a slot (S104). The modem unit 54 and the like broadcast the data using the selected slot (S106). If there is any data to be broadcast (Y of S108) and if a predetermined number of frames has not yet elapsed (N of S110), return to Step S106. If the predetermined number of frames has elapsed (Y of S110), return to Step S102. If there is no data to be broadcast (N of S108), the process will come to an end.

A modification will now be described. Similar to the exemplary embodiments, the modification relates to a communication system 100 including the access control apparatus 10 and the terminal apparatuses 14. In the exemplary embodiments, the access control apparatus 10 broadcasts the timing of a frame using the control information. According to the modification, the access control apparatus 10 broadcasts frames by adding still another information to the control information for the purpose of further reducing the collision probability of data. The access control apparatus 10 identifies slots not used in communication among a plurality of terminal terminals (hereinafter referred to as "empty slots" or "unused slots") by measuring the received power in each slot. Note also that those which may be assigned as the empty slots are those excluding the control slots. The access control apparatus 10 identifies slots having any collision (hereinafter referred to as "collision slots") by also measuring in each slot for any collision of packet signals transmitted by the plurality of terminal apparatuses. Note also that those which may be identified as the collision slots are those excluding the control slots.

The access control apparatus 10 further adds information on the identified empty slots and the identified collision slots to the control information. A terminal apparatus 14 estimates empty slots based on the control information, and randomly selects a slot out of the empty slots. Further, the terminal apparatus 14 transmits, by broadcast, the data using the selected slot. The communication system 100 and the terminal apparatus 14 according to the modification are of similar type to those described in conjunction with FIG. 1 and FIG. 5. A description is given here centering around features different from those described in conjunction with FIG. 1 and FIG. 5.

Figure 8:
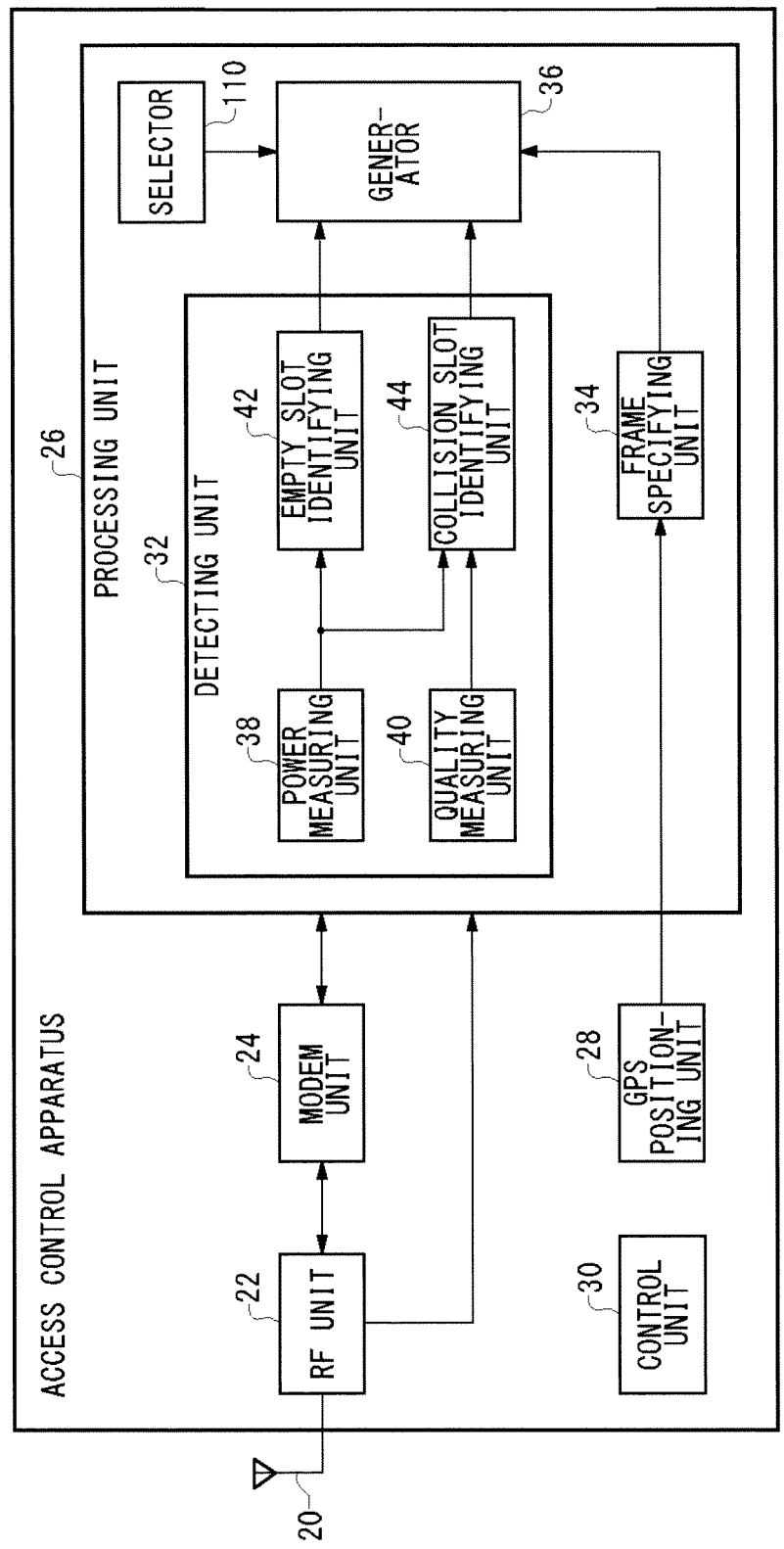
FIG. 8 shows a structure of an access control apparatus according to a modification.

FIG. 8 shows a structure of the access control apparatus 10 according to the modification. The access control apparatus 10 includes an antenna 20, an RF unit 22, a modem unit 24, a processing unit 26, a GPS positioning unit 28, and a control unit 30. The processing unit 26 includes a detecting unit 32, a frame specifying unit 34, a generator 36, and a selector 110. The detecting unit 32 includes a power measuring unit 38, a quality measuring unit 40, an empty slot identifying unit 42, and a collision slot identifying unit 44. The antenna 20, the RF unit 22, the modem unit 24, the GPS positioning unit 28, the control unit 30, and the frame specifying unit 34 correspond respectively to the antenna 150, the RF unit 152, the modem unit 154, the GPS positioning unit 158, the control unit 162, and the frame generator 160 and therefore the repeated description thereof is omitted here.

The selector 110 performs carrier sensing on each slot of the respective plurality of control slots in the control region 220, and selects one control slot out of them based on the carrier sensing result. Since the processing performed by the selector 110 is similar to that by the processing unit 156 of FIG. 2, the description thereof is omitted here. The selector 110 outputs information on the selected control slot to the generator 36.

The power measuring unit 38 receives a received signal from the RF unit 22 or the modem unit 24 and measures the received power. Note that the received power is measured slot by slot. Also, slots correspond to slots other than the control slots. Hence, the power measuring unit 38 measures the received power for each of the plurality of slots. The power measuring unit 38 outputs the received power for each slot to the empty slot identifying unit 42 and the collision slot identifying unit 44. The quality measuring unit 40 receives the demodulation result from the modem unit 24 and measures the signal quality for each of the plurality of slots. The signal quality measured herein is the error rate. Here, slots correspond to slots other than the control slots, too. It should be noted that known art can be used for the measurement of the error rate, so that the description thereof is omitted here. Also, instead of the error rate, EVM (Error Vector Magnitude) or the like may be measured as the signal quality. The quality measuring unit 40 outputs the error rate to the collision slot identifying unit 44.

The empty slot identifying unit 42 receives the received power for each slot from the power measuring unit 38. The empty slot identifying unit 42 compares each received power against a threshold value (hereinafter referred to as "threshold value for empty slot") and identifies the slot for which the received power is smaller than the threshold value for empty slot. That is, the empty slot identifying unit 42 detects, from among a plurality of slots other than those contained in the control region 220, a slot that can be used in communication between a plurality of terminal apparatuses, as an empty slot. Note here that when there are a plurality of empty slots, the empty slot identifying unit 42 identifies them as empty slots. The empty slot identifying unit 42 outputs information on the identified empty slots to the generator 36.

The collision slot identifying unit 44 receives the received power for each slot from the power measuring unit 38 and receives the error rate for each slot from the quality measuring unit 40. Also, the collision slot identifying unit 44 associates the received power with the error rate, slot by slot. The collision slot identifying unit 44 compares not only the received power against a first threshold value, but also the error rate against a second threshold value, slot by slot. The collision slot identifying unit 44 identifies, as a collision slot, a slot for which the received power is larger than the first threshold value and at the same time the error rate is higher than the second threshold value. That is, the collision slot identifying unit 44 recognizes, as a collision slot, a slot for which the received power is large but the communication quality is inferior. In this manner, the collision slot identifying unit 44 detects, as a collision slot, a slot in which a collision has occurred due to duplicate transmission of signals sent from a plurality of terminal apparatuses. The collision slot identifying unit 44 outputs information on the identified collision slots to the generator 36.

The generator 36 receives information on empty slots from the empty slot identifying unit 42 and also receives information on collision slots from the collision slot identifying unit 44. The generator 36 generates control information by adding the information on empty slots and the information on collision slots thereto. Note here that the numbers, 1, 2, . . . from the start (hereinafter referred to as "slot numbers") are given respectively to a plurality of slots contained in a frame. The generator 36 adds the slot number(s) of the empty slot(s) contained in the previous frame(s) as information on empty slots to the control information. Also, the generator 36 receives information on frames and slots from the frame specifying unit 34. The generator 36 periodically assigns the control information to any one of control slots. The generator 36 outputs the control information to the modem unit 24, using the thus assigned control slot.

In the exemplary embodiments, the estimation unit 82 of the terminal apparatus 14 estimates empty slots based on the carrier sensing result. According to the modification, in contrast thereto, the estimation unit 82 estimates empty slots based on the information on empty slots and/or the information on collision slots contained in the control information. A description is given herein of processing performed by the terminal apparatus 14 according to the modification.

The control information extraction unit 66 receives the control information fed from the modem unit 54. The control information extraction unit 66 acquires the information on empty slots and the information on collision slots from the control information. The control information extraction unit 66 outputs the information on empty slots and the information on collision slots to the estimation unit 82. The estimation unit 82 receives the information on empty slots and the information on collision slots from the control information extraction unit 66. The estimation unit 82 extracts empty slots from the slots excluding those in the control region 220 in a frame, based on the information on empty slots. The estimation unit 82 outputs information on the estimated empty slots to the selection unit 84. Since the processing performed by the selection unit 84 is similar to that described so far, the description thereof is omitted.

While such processing continues, the control information extraction unit 66 continues to extract the information on empty slots and the information on collision slots, from the control information, frame by frame. Based on the information on collision slots, the identifying unit 90 checks to see if any of the slot numbers corresponding to the slots in current use is mistaken as a collision slot. If no slot is mistaken as a collision slot, the identifying unit 90 will continue to output the same slot numbers as before to the generator 64. If, on the other hand, any slot is mistaken as a collision slot, the estimation unit 82 will again estimate empty slots based on the information on empty slots. In other words, the slot decision unit 68 repeats the previous processing.

If the control information received by the control information extraction unit 66 does not contain the information on empty slots, the slot decision unit 68 may execute the operation described in the exemplary embodiments. This corresponds to a case where broadcast is not the control information from the access control apparatus 10 of FIG. 8 but the control information from the access control apparatus 10 of FIG. 12. In this case, the carrier sensing unit 80 performs carrier sensing on each of a plurality of slots contained in the frame generated by the control information extraction unit 66. If the control information extraction unit 66 does not receive the information on empty slots, the estimation unit 82 will estimate empty slots based on the carrier sensing result obtained from the carrier sensing unit 80.

Figure 9:
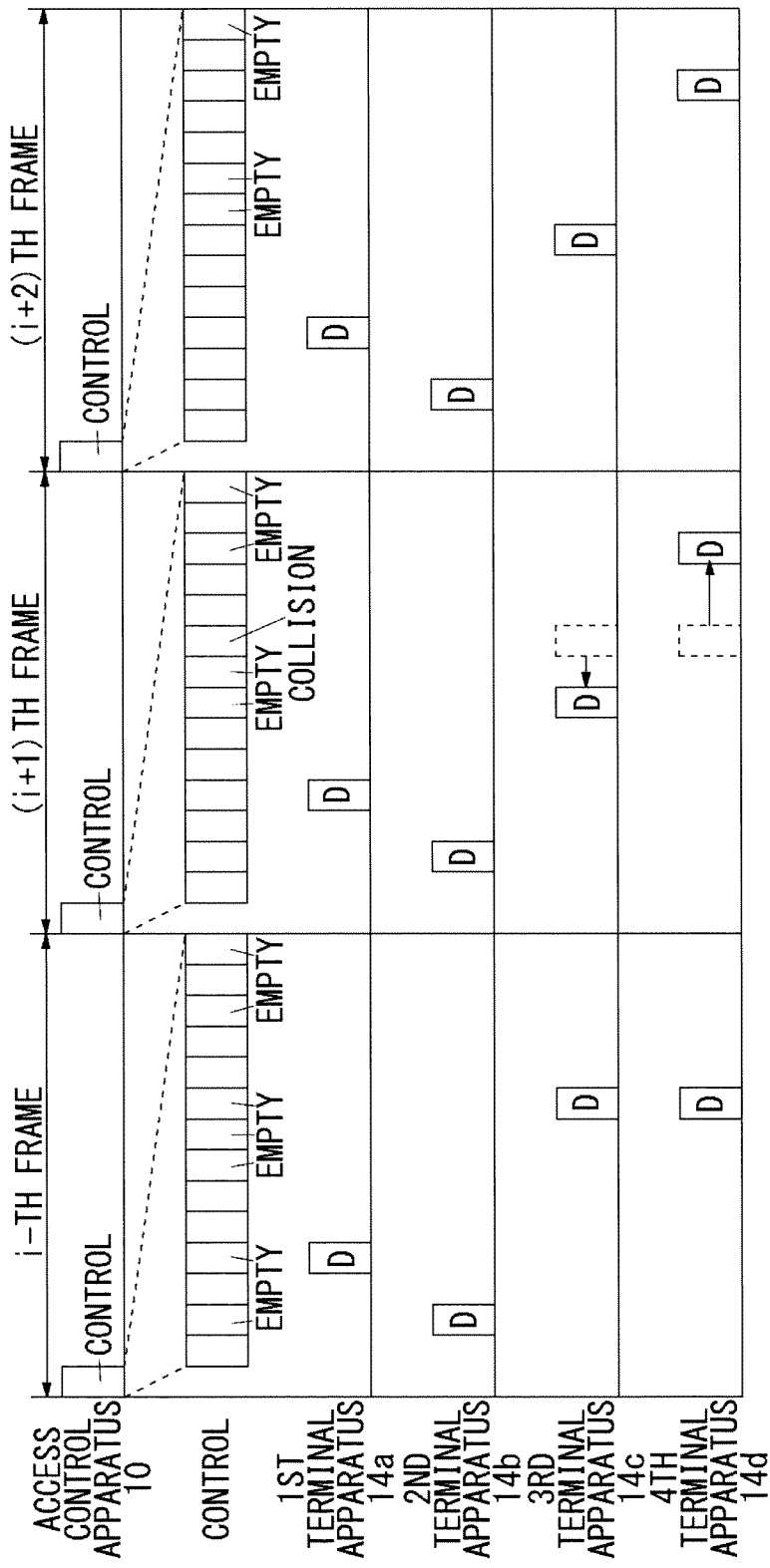
FIG. 9 shows an operational overview of a communication system according to the modification.

FIG. 9 shows an operational overview of the communication system 100 according to the modification. The horizontal direction of FIG. 9 corresponds to time, and three frames that are an ith frame to an (i+2)th frame are indicated as described in the top row. Assume herein for the clarity of description that the number of control slots contained in each frame is one and each frame contains 15 slots. As shown in FIG. 9, the access control apparatus 10 broadcasts the control information using the leading slot of each frame. "Control" in FIG. 9 indicates control information. Below "control", information on empty slots and information on collision slots both contained in the control information are indicated by associating them with slots. "Empty" in FIG. 9 indicates an empty slot, whereas "collision" in FIG. 9 indicates a collision slot.

In the rows below the top row, the timings with which the first terminal apparatus 14*a* to the four terminal apparatus 14*d* broadcast the data are indicated. "D" in FIG. 9 means data. The first terminal apparatus 14*a* to the fourth terminal apparatus 14*d* each references the control information and selects an empty slot. The first terminal apparatus 14*a* to fourth terminal apparatus 14*d* each broadcasts the data using the selected empty slot in the ith frame. Since the empty slot selected by the third terminal apparatus 14*c* is identical to the empty slot selected by the fourth terminal apparatus 14*d*, the data broadcast from them collide with each other. The access control apparatus 10 detects the occurrence of collision in said slot. The control information, broadcast from the access control apparatus 10, in the (i+1)th frame indicates the slot where the collision occurs, as the information on the collision slot.

Since no collision occurs in the slots used by the first terminal apparatus 14*a* and the second terminal apparatus 14*b*, the slots having the same slot numbers are used again. On the other hand, since collision has occurred in the slots used by the third terminal apparatus 14*c* and the fourth terminal apparatus 14*d*, different empty slots are selected again. The third terminal apparatus 14*c* and the fourth terminal apparatus 14*d* broadcast data, using the selected empty slots. Since not all of data collides, the collision slots are not indicated in the control information, broadcast from the access control apparatus 10, in the (i+2)th frame. Thus, the first terminal apparatus 14*a* to the fourth terminal apparatus 14*d* use again the slots, having the same slot numbers as the slots used already, in the (i+2)th frame.

Figure 10:
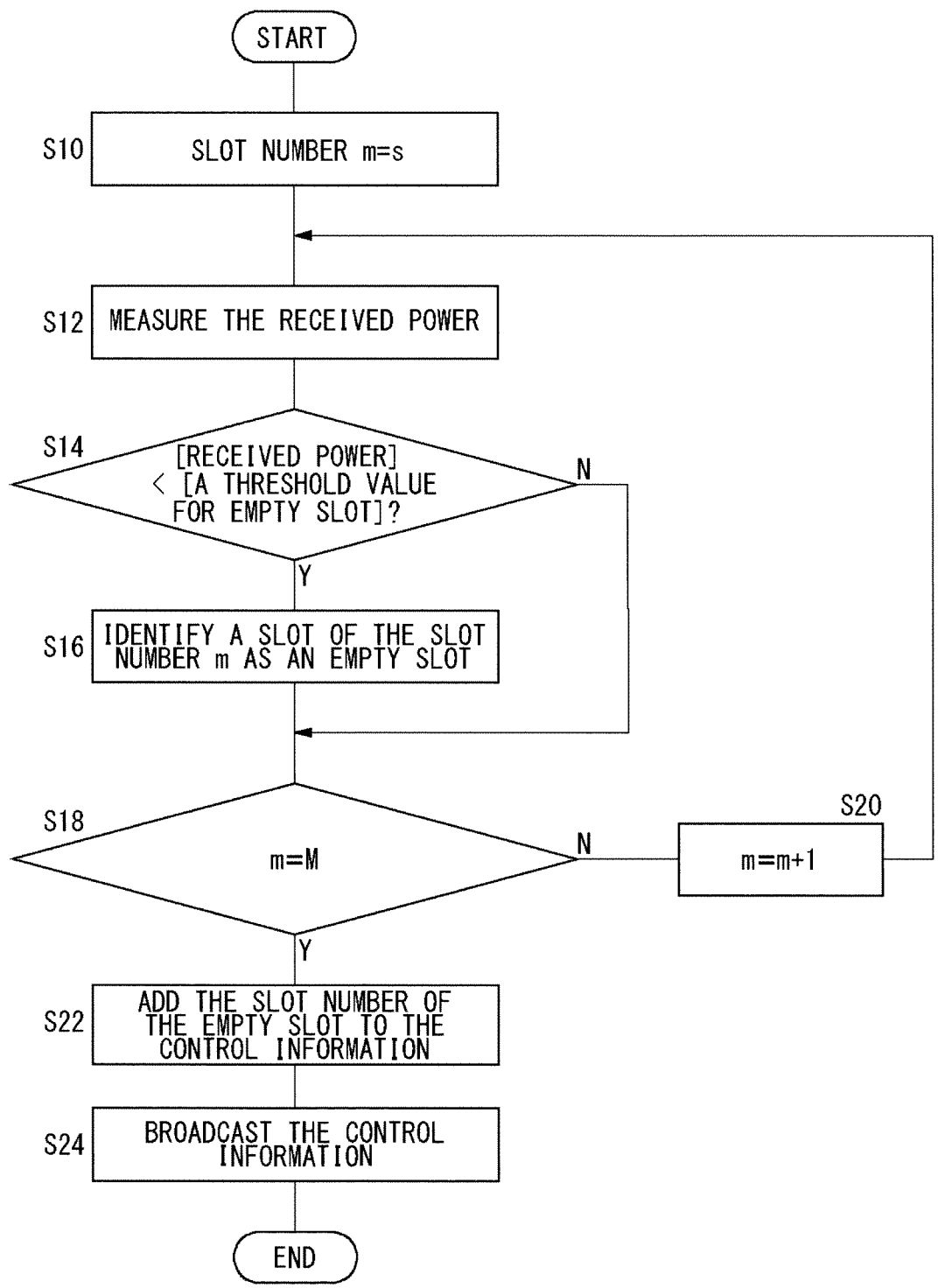
FIG. 10 is a flowchart showing a procedure in which the access control apparatus of FIG. 8 conveys an empty slot.

FIG. 10 is a flowchart showing a procedure in which the access control apparatus 10 conveys an empty slot. The detecting unit 32 sets the slot number m to "s" (S10). The power measuring unit 38 measures the received power (S12). If the received power is less than the threshold value for empty slot (Y of S14), the empty slot identifying unit 42 will identify the slot of the slot number m as an empty slot (S16). If the received power is not less than the threshold value for empty slot (N of S14), the empty slot identifying unit 42 will skip the process of Step S16. If the slot number m is not equal to the maximum number M (N of S18), the detecting unit 32 will increment the slot number m by 1 (S20) and the process will return to Step S12. If, on the other hand, the slot number m is the maximum number M (Y of S18), the generator 36 will add the slot number of the empty slot to the control information (S22). The modem unit 24 and the RF unit 22 broadcast the control information (S24).

Figure 11:
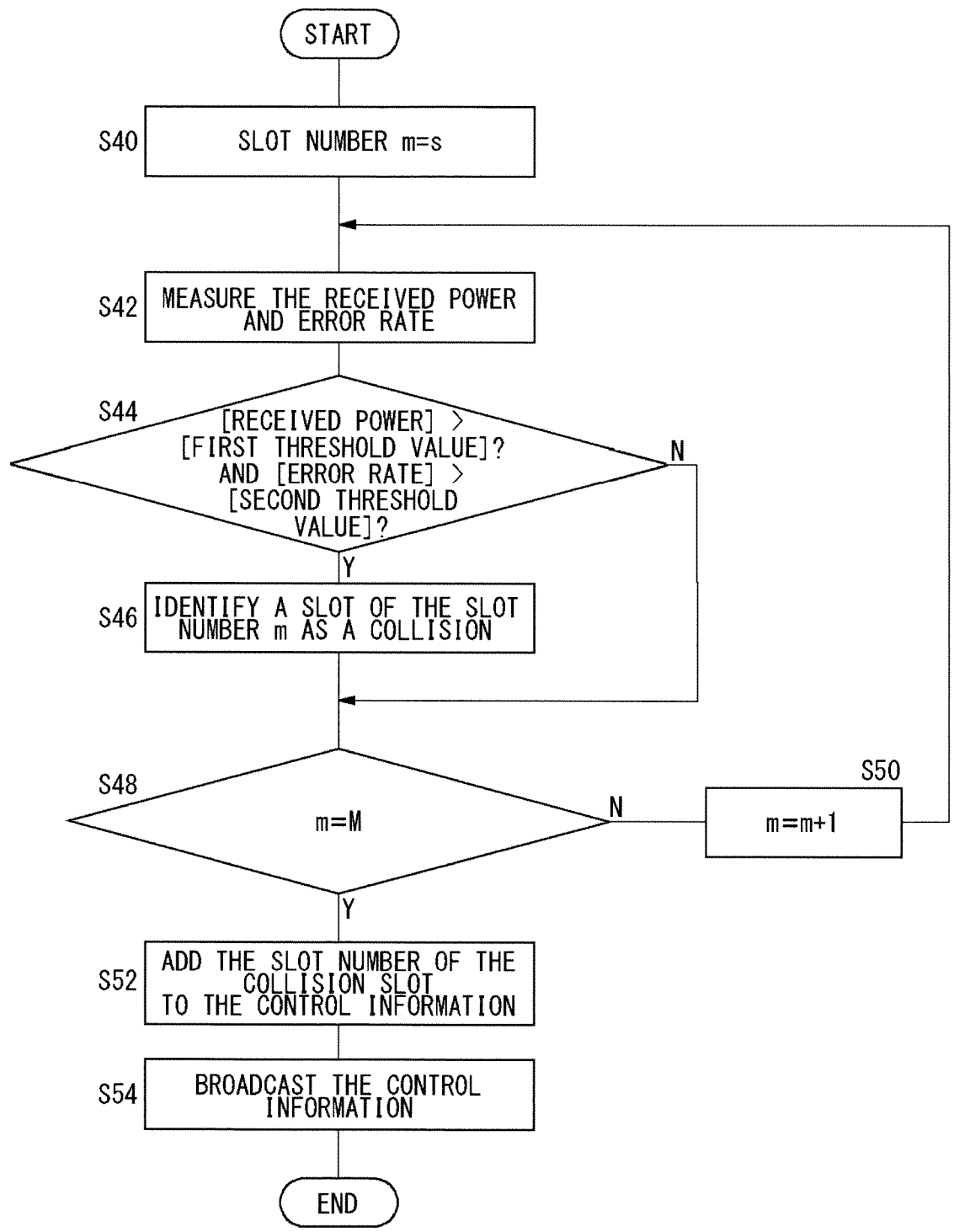
FIG. 11 is a flowchart showing a procedure in which the access control apparatus of FIG. 8 conveys a collision slot.

FIG. 11 is a flowchart showing a procedure in which the access control apparatus 10 conveys a collision slot. The detecting unit 32 sets the slot number m to "s" (S40). The power measuring unit 38 measures the received power, and the quality measuring unit 40 measures the error rate (S42). If the received power is greater than the first threshold value and the error rate is greater than the second threshold value (Y of S44), the collision slot identifying unit 44 will identify the slot of the slot number m as a collision slot (S46). If the received power is not greater than the first threshold value or the error rate is not greater than the second threshold value (N of S44), the collision slot identifying unit 44 will skip the process of Step S46. If the slot number m is not equal to the maximum number M (N of S48), the detecting unit 32 will increment the slot number m by 1 (S50) and the process will return to Step S42. If, on the other hand, the slot number m is the maximum number M (Y of S48), the generator 36 will add the slot number of the collision slot to the control information (S52). The modem unit 24 and the RF unit 22 broadcast the control information (S54).

Figure 12:
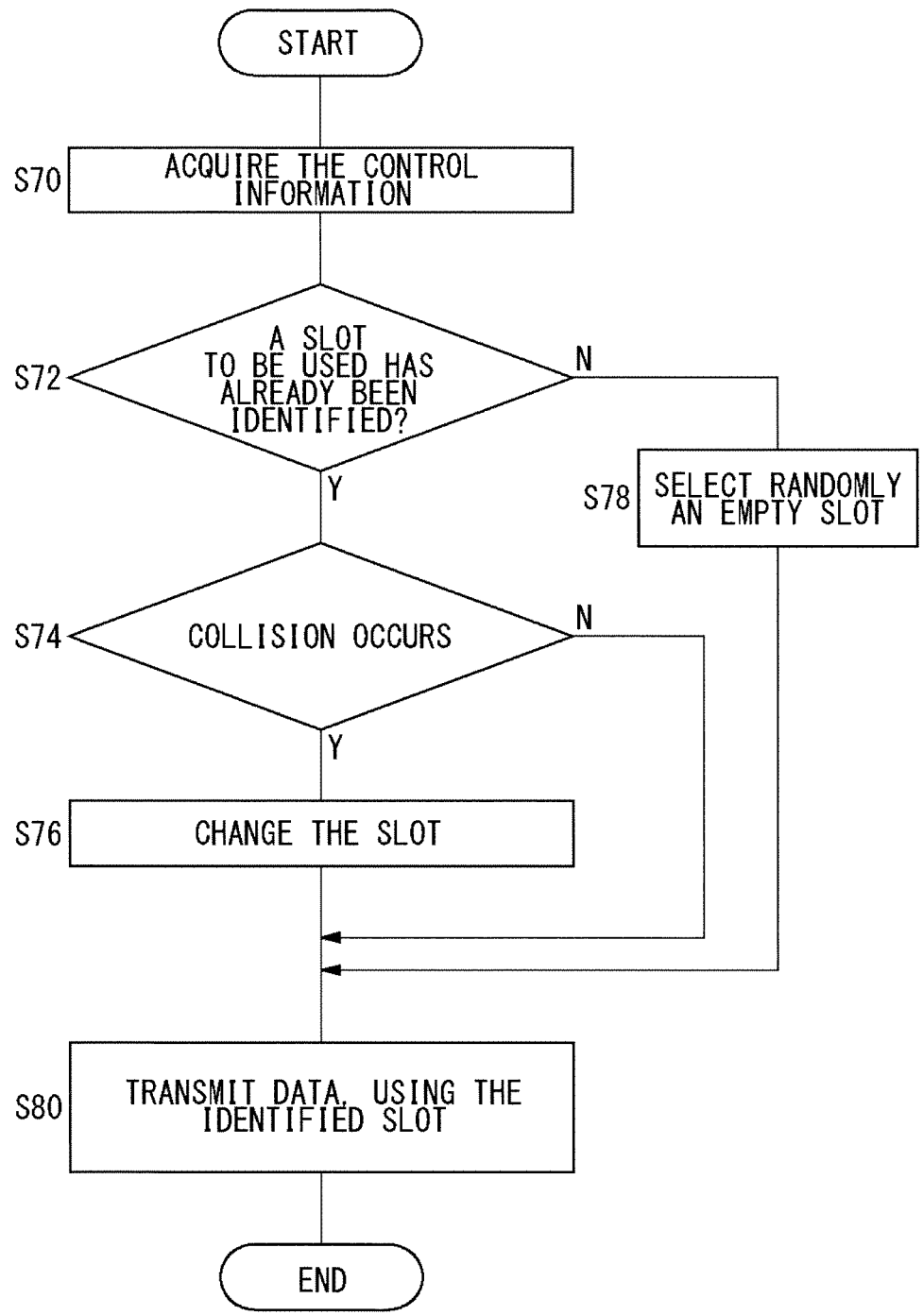
FIG. 12 is a flowchart showing a data transmission procedure performed by a terminal apparatus according to the modification.

FIG. 12 is a flowchart showing a data transmission procedure performed by the terminal apparatus 14. The control information extraction unit 66 acquires the control information (S70). If a slot to be used has already been identified (Y of S72), the slot decision unit 68 will verify whether collision occurs in this slot or not. If collision occurs (Y of S74), the slot decision unit 68 will change the slot (S76). If no collision occurs (N of S74), Step S76 will be skipped. If, on the other hand, a slot to be used has not already been identified (N of S72), the slot decision unit 68 will estimate empty slots and then randomly identify an empty slot (S78). The generator 64 transmits data, using the thus identified slot (S80).

Figure 13:
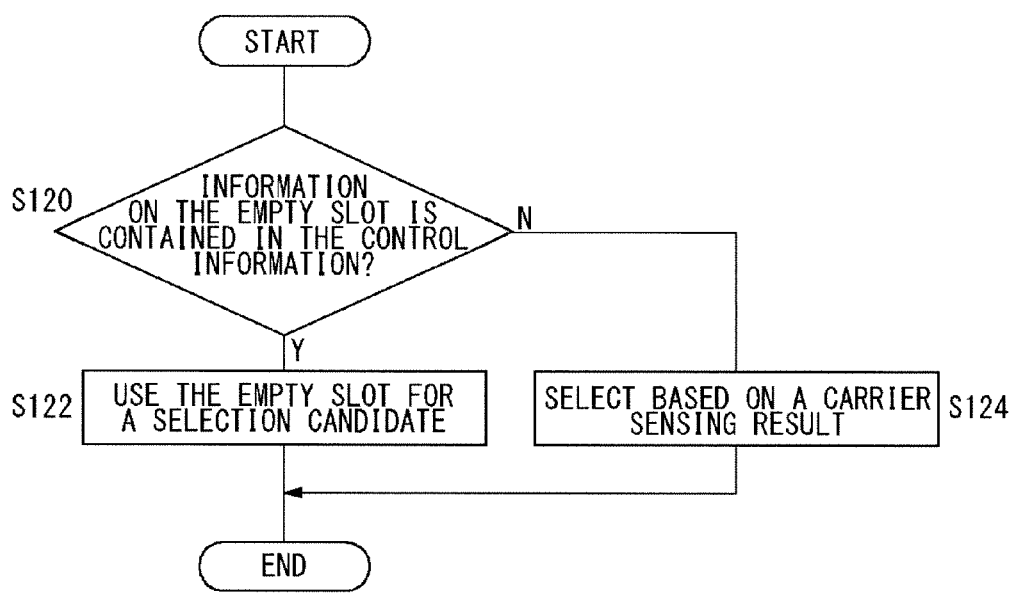
FIG. 13 is a flowchart showing another data transmission procedure performed by a terminal apparatus according to the modification.

FIG. 13 is a flowchart showing another data transmission procedure performed by the terminal apparatus 14 according to the modification. If information on empty slots is contained in the control information received by the control information extraction unit 66 (Y of S120), the estimation unit 82 will use the empty slots associated with the information on empty slots as slot candidates from which an empty slot is selected (S122). If the information on empty slots is not contained in the control information received by the control information extraction unit 66 (N of S120), the estimation unit 82 will select an empty slot based on the result of carrier sensing performed by the carrier sensing unit 80 (S124).

In the modification, the terminal apparatus 14 does not perform carrier sensing if the information on empty slots is contained in the control information. However, the terminal apparatus 14 may perform carrier sensing even though the information on empty slots is contained in the control information. For example, the carrier sensing unit 80 performs carrier sensing on each of a plurality of slots in the frame generated by the control information extraction unit 66. The control information extraction unit 66 extracts the information on empty slots from the control information. The estimation unit 82 estimates empty slots based on the information on empty slots received by the control information extraction unit 66 and the result of carrier sensing performed by the carrier sensing unit 80.

More specifically, the estimation unit 82 estimates empty slots, as described previously, based on the interference power measured by the carrier sensing unit 80 (hereinafter such empty slot(s) will be referred to as "empty slot of first kind"). At the same time, the estimation unit 82 checks slots associated with the information on empty slots supplied from the control information extraction unit 66 (hereinafter such empty slot(s) will be referred to as "empty slot of second kind"). Further, the estimation unit 82 determines an empty slot, which belongs to both the slots of first kind and those of second kind, to be a final empty slot. If, on the other hand, there is no common empty slots that belong to both the slots of first kind and those of second kind, the estimation unit 82 will determine those of second kind as the final empty slots. Note that in such a case the estimation unit 82 may determine those of second kind as the final empty slots, instead.

Figure 14:
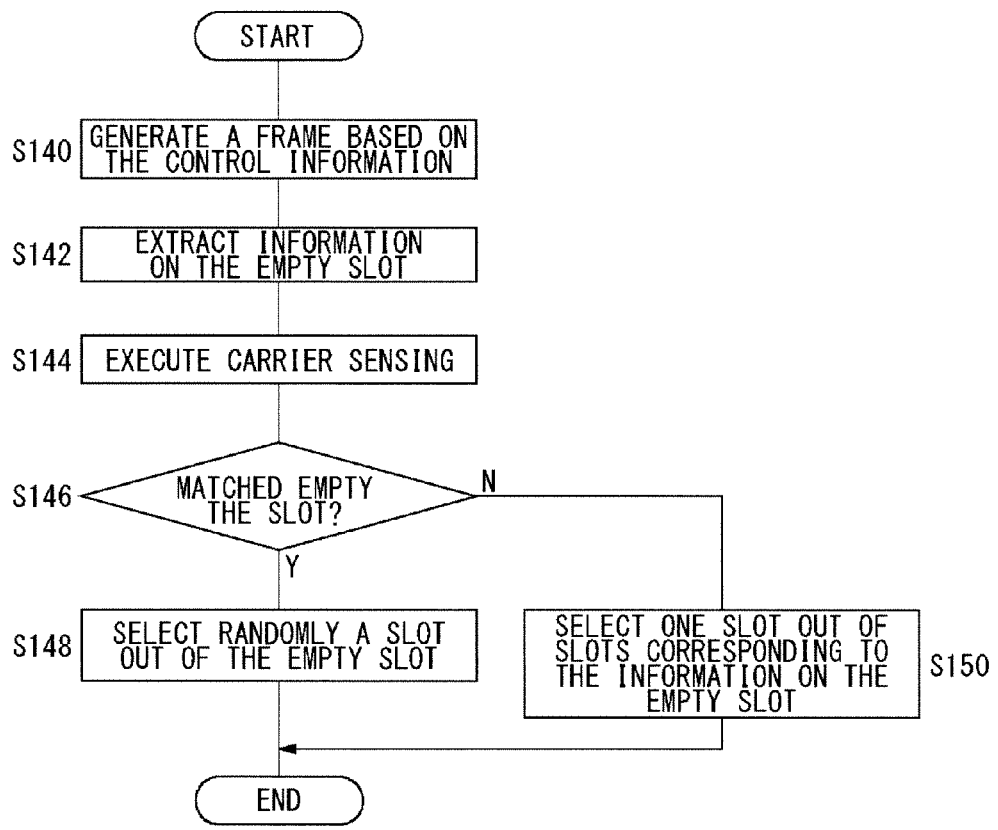
FIG. 14 is a flowchart showing still another data transmission procedure performed by a terminal apparatus according to the modification.

FIG. 14 is a flowchart showing still another data transmission procedure performed by the terminal apparatus 14 according to the modification. The control information extraction unit 66 generates frames based on the control information (S140). The control information extraction 66 extracts the information on empty slots (S142). The carriers sensing unit 80 performs carrier sensing (S144). If there is matching between the empty slots associated with the information on empty slots and those estimated from the carrier sensing result (Y of S146), the selection unit 84 will randomly select a slot from the empty slots (S148). If, on the other hand, there is no matched empty slots between the empty slots associated with the information on empty slots and those estimated from the carrier sensing result (N of S146), the selection unit 84 will select a slot from the slots associated with the information on empty slots (S150).

Another modification will now be described. Similar to the exemplary embodiments, the another modification relates to a terminal apparatus which estimates empty slots out of a plurality of slots and selects any of the empty slots. The access control apparatus 10 according to the exemplary embodiments randomly selects any of the empty slots. In contrast thereto, a terminal apparatus according to the another modification selects an empty slot, based on the identification number assigned to identify the terminal apparatus. Since the identification numbers are so assigned as to differ from those assigned to the other different terminal apparatuses, the probability that the selected empty slot overlaps with an empty slot of another terminal apparatus is reduced. The communication system 100 according to the another embodiment is of similar type to that described in conjunction with FIG. 1.

Figure 15:
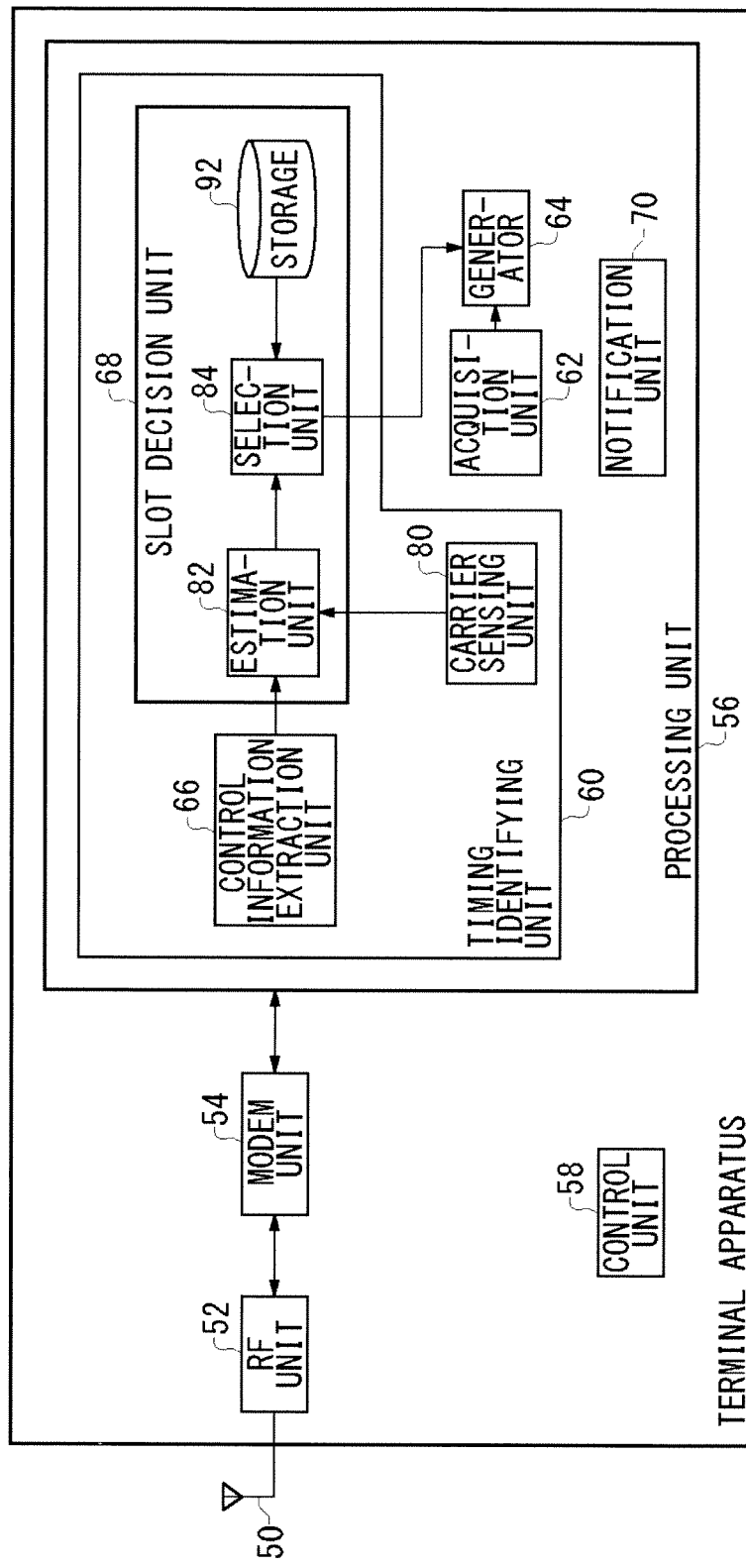
FIG. 15 shows a structure of a terminal apparatus according to another modification.

FIG. 15 shows a structure of a terminal apparatus 14 according to the another modification. The terminal apparatus 14 includes an antenna 50, an RF unit 52, a modem unit 54, a processing unit 56, and a control unit 58. The processing unit 56 includes a timing identifying unit 60, an acquisition unit 62, a generator 64, and a notification unit 70. The timing identifying unit 60 includes a control information extraction unit 66, a slot decision unit 68, and a carrier sensing unit 80. The slot decision unit 68 includes an estimation unit 82, a selection unit 84, and a storage 92. A description is given here centering around features different from those described in conjunction with FIG. 5.

The estimation unit 82 outputs information on the estimated empty slots to the selection unit 84. The storage 92 stores identification numbers used to identify terminal apparatuses 14. Each identification number is formed by a plurality of digits. Assume herein that the identification number is expressed by a decimal number. The selection unit 84 receives information on empty slots from the estimation unit 82. The selection unit 84 selects any of the empty slots based on the identification numbers stored in the storage 92. More specifically, if the number of slots indicated by the information on empty slots is less than three digits, the estimation unit 82 will derive the remainder that results when the identification number is divided by the number of empty slots. Also, the selection unit 84 selects a slot whose order, counted from the beginning of the empty slots, corresponds to the remainder. If, on the other hand, the number of slots indicated by the information on empty slots is greater than three digits, the selection unit 84 will select a slot whose order, counted from the beginning of the empty slots, corresponds to the identification number. The selection unit 84 outputs information on the selected slot to the generator 64.

Next, still another modification will be described. Similar to the terminal apparatus described so far, the still another modification relates to a terminal apparatus which estimates empty slots out of a plurality of slots and selects any of the empty slots. The terminal apparatus according to the still another modification measures the distance between the terminal apparatus and the access control apparatus. A rule is set beforehand so that a slot to be used is selected based on the measured distance. The communication system 100 according to the still another embodiment is of similar type to that described in conjunction with FIG. 1.

Figure 16:
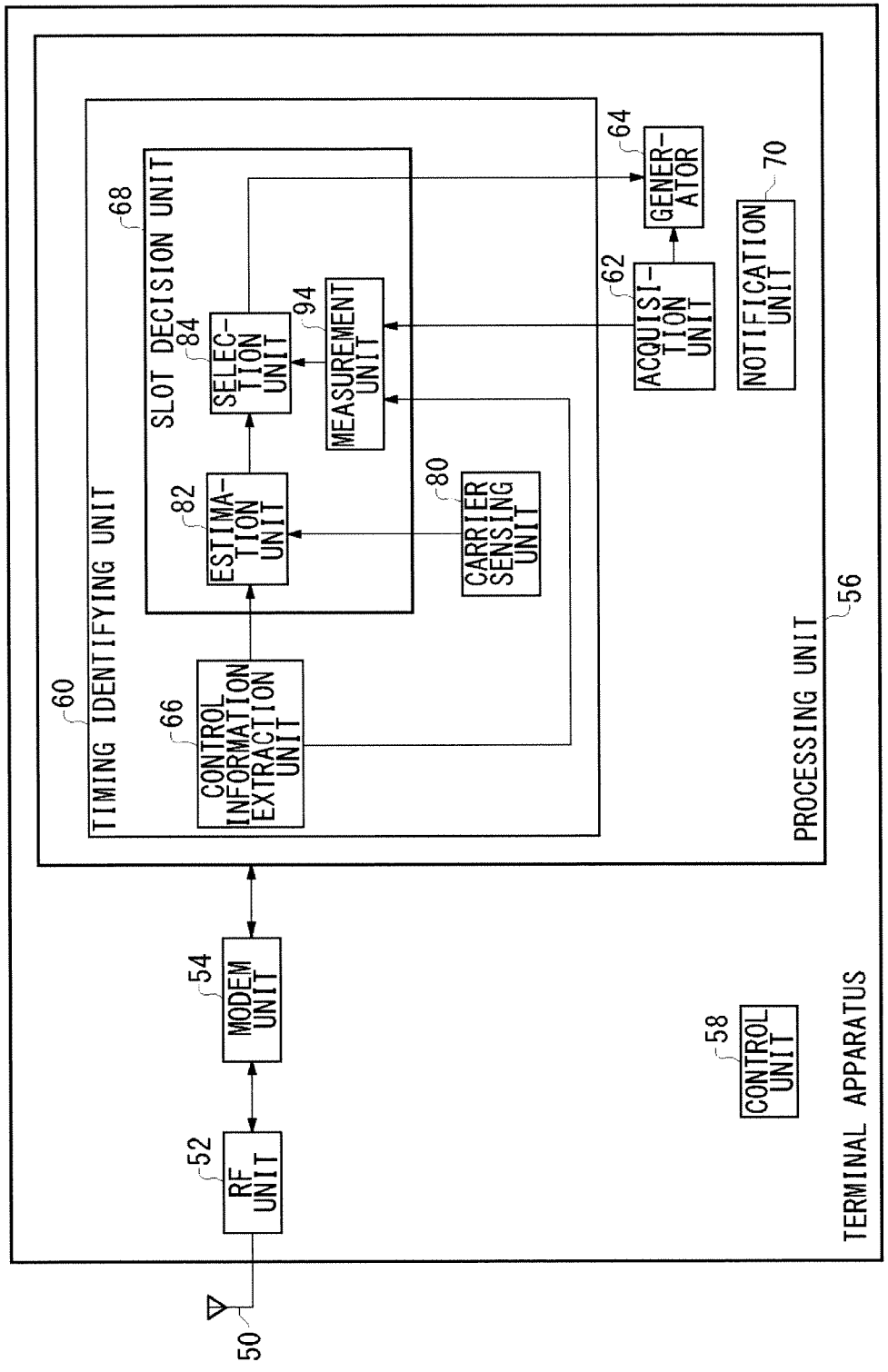
FIG. 16 shows a structure of a terminal apparatus according to still another modification.

FIG. 16 shows a structure of a terminal apparatus 14 according to the still another modification. The terminal apparatus 14 includes an antenna 50, an RF unit 52, a modem unit 54, a processing unit 56, and a control unit 58. The processing unit 56 includes a timing identifying unit 60, an acquisition unit 62, a generator 64, and a notification unit 70. The timing identifying unit 60 includes a control information extraction unit 66, a slot decision unit 68, and a carrier sensing unit 80. The slot decision unit 68 includes an estimation unit 82, a selection unit 84, and a measurement unit 94. A description is given here centering around features different from those described in conjunction with FIG. 5.

In addition to the aforementioned operations, the control information extraction unit 66 acquires positional information contained in the control information. The thus acquired positional information corresponds to the positional information of a not-shown access control apparatus 10. To cope with this, the access control apparatus 10 adds the positional information to the control information. The control information extraction unit 66 outputs the positional information of the access control apparatus 10 to the measurement unit 94. The measurement unit 94 receives not only the positional information of the access control apparatus 10 from the control information extraction unit 66 but also the positional information of the terminal apparatus 14 from the acquisition unit 62. The measurement unit 94 measures the distance between the access control apparatus 10 and the terminal apparatus 14. For example, the vector operation is used for the measurement of the distance. The measurement unit 94 outputs the measured distance to the selection unit 84.

In this modification, a plurality of slots contained in a frame generated by the control information extraction unit 66 are each associated with the distance. The selection unit 84 stores beforehand the correspondence between each slot and the distance. FIG. 17 shows a data structure of a table stored in the selection unit 84. As shown in FIG. 17, the table contains a distance column 230 and a slot column 232. A plurality of stages are defined as a distance range in the distance column 230. The slot column 232 indicates slots corresponding to the distance ranges, respectively. As shown in FIG. 17, a plurality of slots are reserved for each range. Let us refer back to FIG. 16. The selection unit 84 selects a slot based on the distance measured by the measurement unit 94. More specifically, the selection unit 84 references the distance column 230 and identifies a distance range corresponding to the measured distance. Then the selection unit 84 references the slot column 232 and identifies a plurality of slots corresponding to the identified distance range. Also, the selection unit 84 extracts empty slot(s) from among the identified plurality of slots. If a plurality of slots are extracted, the selection unit 84 will select one of them. Selecting one of a plurality of extracted slots may be done following a prescribed rule or carried out randomly. The selection unit 84 outputs information on the selected slot to the generator 64.

According to the exemplary embodiments, data is broadcast using the slots generated according to the control information conveyed from the access control, so that synchronization can be established between a plurality of terminal apparatuses. Also, since synchronization can be established between a plurality of terminal apparatuses, the collision probability of data can be reduced. Also, since the data is broadcast within slots, the occurrence of situations where parts of a plurality of data overlap and thereby collide with each other can be reduced. Also, since the data is broadcast within slots, the usage efficiency of frame can be reduced. Also, empty slots are estimated and any of them is/are selected, so that the collision probability of packet signals can be reduced even when the communication volume has increased. Also, the empty slots are estimated based on the carrier sensing result, so that the empty slots suitable for the surroundings of a terminal apparatus can be estimated.

Also, the empty slots are estimated based on the control information, so that the empty slots suitable for the surroundings of the access control apparatus can be estimated. Also, carrier sensing is performed if the information on empty slots is not contained in the control information, so that the processing according to various access control apparatuses can be carried out. Also, the common empty slot belonging to both the slots of first kind and the those of second kind is determined to be the final empty slot, so that the precision in estimating the empty slots can be improved. Also, either the slot(s) of first kind or the slot(s) of second kind is/are determined to the empty slots if there is no common empty slot between them, so that the processing can continue smoothly. Also, any of the empty slots is/are selected at random, the collision probability of data can be reduced.

Also, the identification carriers in the control information are not used for data, whereas the remaining subcarriers are also used for data. Thus, even if the control information and data signals collide, the presence of the control information can be detected by observing the signal components of the control information. Also, the guard band is provided between the identification carrier and the other subcarriers, so that the interference therebetween can be reduced and the probability of arrival of information transmitted using the identification carrier can be improved. Also, important information is assigned to the identification carrier, so that the probability of arrival of important information can be improved. Also, the UW is assigned to the identification carrier, so that the degree of accuracy in detecting the identification carriers can be improved.

Also, the control region is reserved exclusively for control slots in a plurality of slots contained in each frame. Thus, the interference between the control information and the data can be reduced. Also, a plurality of control slots are assigned to the control region, so that the interference between a plurality of pieces of control information from a plurality of access control apparatuses can be reduced. Also, since the interference therebetween is reduced, the deterioration in the quality of the control information can be suppressed. Also, since the deterioration in the quality of the control information is suppressed, the contents of control information can be transmitted accurately. Also, since the interference between a plurality of pieces of control information is reduced, a plurality of access control apparatuses can be installed. Also, since a plurality of access control apparatuses are installed, the collision probability of packet signals occurring at each intersection can be reduced. Also, control slots not used by other access control apparatuses are estimated, so that the interference between a plurality of pieces of control information can be reduced Also, the slots usable in communication between a plurality of terminal apparatuses are broadcast from among a plurality of slots. Thus the probability of collisions occurring in communication between the plurality of terminal apparatuses can be reduced. Also, since the probability of collisions occurring in communication between the plurality of terminal apparatuses is reduced, the collision probability of packet signals under the conditions of increased volume can be reduced. Also, empty slots are identified based on the received powers of a plurality of slots, respectively, so that the empty slots can be easily identified. Also, the slot number of an empty slot which is contained in a previous frame is broadcast, so that the instructions to the terminal apparatuses can be executed reliably. Also, a terminal apparatus, which is using the empty slot, uses a slot that corresponds to said slot, over a plurality of frames, so that the processing can be simplified. Also, the access control apparatus does not directly participate in the data communication between terminal apparatuses but only conveys a parameter related to the empty slots. Hence, the structure and operation according to the exemplary embodiments are easily applicable to a communication system premised on CSMA/CA, too.

Also, the slot in which a collision has occurred due to duplicate transmission of signals from the plurality of terminal apparatuses is broadcast. Thus, the probability of collisions occurring in communication between the plurality of terminal apparatuses can be reduced. Also, the collision slots are identified based on the received powers of the plurality of slots, respectively, and the signal qualities of the plurality of slots, respectively, so that the collision slots can be easily identified. Also, the slot number of a collision slot which is contained in a previous frame is broadcast, so that the instructions to the terminal apparatuses can be executed reliably. Also, the access control apparatus does not directly participate in the data communication between terminal apparatuses but only conveys a parameter related to the collision slots. Hence, the structure and operation according to the exemplary embodiments are easily applicable to a communication system premised on CSMA/CA, too.

Also, since the slots are selected based on the identification numbers, the processing can be simplified. Also, since the identification number is assigned so that it differs from the identification numbers of other terminal apparatuses, the degradation of the slot collision probability can be reduced. Also, since the slots are selected based on the distance, terminal apparatuses located nearer the access control apparatus can use many more of slots. Also, terminal apparatuses located nearer the access control apparatus can use many more of slots, a collision can be easily found by the access control apparatus in case the collision occurs on the slots.

The present invention has been described based on the exemplary embodiments. The exemplary embodiments are intended to be illustrative only, and it is understood by those skilled in the art that various modifications to constituting elements and processes as well as arbitrary combinations thereof could be further developed and that such modifications and combinations are also within the scope of the present invention.

In the exemplary embodiments of the present invention, the frame generator 160 specifies frames each of which is constituted by a plurality of slots. However, this should not be considered as limiting and, for example, the frame generator 160 may provide periods (fields) other than the plurality of slots, in each frame. More specifically, a plurality of slots may be assigned in a partial period of a frame, whereas the CSMA/CA scheme may be used in communication between a plurality of terminal apparatuses 14 in the remaining periods. In such a case, the access control apparatus does not detect the empty slots and the collision slots while the CSMA/CA scheme is in use. According to this modification, each terminal apparatus 14 can select the communication mode between a communication using slots and a communication using the CSMA/CA scheme. Hence, the degree of freedom in communications can be increased. In other words, it suffices that each frame contains a plurality of slots.

In the exemplary embodiments of the present invention, the control information broadcast from the access control apparatus and the data broadcast from a terminal apparatus 14 are each assigned to a single slot. However, this should not be considered as limiting and, for example, the control information and the data may each be assigned to two or more slots. According to this modification, the transmission rate of control information and data can be increased.

In the exemplary embodiments of the present invention, an identification carrier is equivalent to two subcarriers. Also, the identification carrier is assigned to the subcarriers near the center frequency of an OFDM symbol. However, this should not be considered as limiting and, for example, the identification carrier may be equivalent to more than two subcarriers. For example, the identification carrier may be assigned to subcarriers other than those near the center frequency of an OFDM symbol. In such a case, the information on empty slots and/or the information on collision slots may be added to the identification carriers. According to this modification, the communication system 100 can be designed more freely.

DESCRIPTION OF THE REFERENCE NUMERALS

10 Access control apparatus
12 Vehicle
14 Terminal apparatus
50 Antenna
52 RF unit
54 Modem unit
56 Processing unit
58 Control unit
60 Timing identifying unit
62 Acquisition unit
64 Generator
66 Control information extraction unit
68 Slot decision unit
70 Notification unit
80 Carrier sensing unit
82 Estimation unit
84 Selection unit
86 Random number generator
88 Division unit
90 Identifying unit
100 Communication system
150 Antenna
152 RF unit
154 Modem unit
156 Processing unit
158 GPS positioning unit
160 Frame generator
162 Control unit

INDUSTRIAL APPLICABILITY

The present invention reduces the collision probability of packet signals even when the communication volume has increased.

What is claimed is:

1. A terminal apparatus, comprising:
a receiving unit configured to receive information on a frame that contains at least a plurality slots from an access control apparatus for controlling communications between a plurality of terminal apparatuses, the access control apparatus not being directly involved in data communication between terminal apparatuses and not directly specifying a slot to be used in the data communication;
a generator configured to generate a frame that contains at least a plurality of slots in such a manner as to synchronize with the frame corresponding to the information received by said receiving unit;
an estimation unit configured to estimate empty slots in the plurality of slots generated by said generator;
a selection unit configured to select at least one of the empty slots estimated by said estimation unit without broadcasting data subsequent to estimation of the empty slots by the estimation unit; and
a broadcasting unit configured to broadcast data using the slot selected by said selection unit.

2. The terminal apparatus according to claim 1, wherein said receiving unit further receives information on empty slots from the access control apparatus, and
said estimation unit estimates the empty slots, based on the information on empty slots received by said receiving unit.

3. The terminal apparatus according to claim 2, further comprising an examining unit configured to perform a carrier sense in the respective plurality of slots contained in the frame generated by said generator, and
wherein when said receiving unit does not receive the information on empty slots, said estimation unit estimates the empty slots, based on a result of the carrier sense performed by said examining unit.

4. The terminal apparatus according to claim 1, further comprising an examining unit configured to perform a carrier sense in the respective plurality of slots contained in the frame generated by said generator, and
wherein said estimation unit estimates the empty slots, based on a result of the carrier sense performed by said examining unit.

5. The terminal apparatus according to claim 1, further comprising an examining unit configured to perform a carrier sense in the respective plurality of slots contained in the frame generated by said generator, wherein
said receiving unit further receives information on empty slots from the access control apparatus, and
said estimation unit estimates the empty slots, based on the information on empty slots received by said receiving unit and a result of the carrier sense performed by said examining unit.

6. The terminal apparatus according to claim 5, wherein when the empty slots are not estimated based on the information on empty slots received by said receiving unit and the result of the carrier sense performed by said examining unit, said estimation unit estimates the empty slots, based on either one of the information on empty slots received by said receiving unit and the result of the carrier sense performed by said examining unit.

7. The terminal apparatus according to claim 1, wherein said selection unit selects at least one least one of the empty slots estimated by said estimation unit, at random.

8. A radio apparatus, comprising:
a receiving unit configured to receive information on a frame that contains at least a plurality slots from an access control apparatus for controlling communications between radio apparatuses;
a generator configured to generate a frame that contains at least a plurality of slots in such a manner as to synchronize with the frame corresponding to the information received by said receiving unit;
an estimation unit configured to estimate empty slots in the plurality of slots generated by said generator;
a selection unit configured to select at least one of the empty slots estimated by said estimation unit; and
a broadcasting unit configured to broadcast data using the slot selected by said selection unit,
said selection unit including:
a random number generator for generating a random number;
a divider for dividing the random number generated by the random number generator, by the number of empty slots estimated by said estimation unit; and
an identifying unit for identifying an empty slot whose order counted from a beginning of a frame corresponds to a remainder of the division performed by the divider.

9. The terminal apparatus according claim 1, further comprising a storage configured to store identification numbers used to identify terminal apparatuses,
wherein said selection unit selects a slot, based on the identification numbers stored in said storage.

10. The terminal apparatus according to claim 1, further comprising a measurement unit configured to measure a distance between the access control apparatus and said terminal apparatus, wherein
the respective plurality of slots contained in the frame generated by said generator are associated with the distance, and
said selection unit selects a slot, based on the distance measured by said measurement unit.

11. A broadcasting method, comprising:
receiving information on a frame that contains at least a plurality slots from an access control apparatus for controlling communications between terminal apparatuses, the access control apparatus not being directly involved in data communication between terminal apparatuses and not directly specifying a slot to be used in the data communication;
generating a frame that contains at least a plurality of slots in such a manner as to synchronize with the frame corresponding to the received information;
estimating empty slots in the plurality of slots generated by said generating;
selecting at least one of the empty slots estimated by said estimating without broadcasting data subsequent to estimation of the empty slots; and
broadcasting data using the slot selected by said selecting.

* * * * *